US011652797B2

(12) United States Patent
Chanak et al.

(10) Patent No.: US 11,652,797 B2
(45) Date of Patent: May 16, 2023

(54) SECURE APPLICATION ACCESS SYSTEMS AND METHODS VIA A LIGHTWEIGHT CONNECTOR AND A CLOUD-BASED SYSTEM

(71) Applicant: Zscaler, Inc., San Jose, CA (US)

(72) Inventors: John A. Chanak, Saratoga, CA (US); Patrick Foxhoven, San Jose, CA (US); William Fehring, Sunnyvale, CA (US); Denzil Wessels, Los Gatos, CA (US); Kunal Shah, San Jose, CA (US); Subramanian Srinivasan, Milpitas, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 16/800,307

(22) Filed: Feb. 25, 2020

(65) Prior Publication Data

US 2020/0195614 A1 Jun. 18, 2020

Related U.S. Application Data

(63) Continuation of application No. 15/986,874, filed on May 23, 2018, now Pat. No. 10,616,180, which is a (Continued)

(51) Int. Cl.
*H04L 9/40* (2022.01)
*G06F 9/54* (2006.01)
(Continued)

(52) U.S. Cl.
CPC .......... *H04L 63/0272* (2013.01); *G06F 9/547* (2013.01); *H04L 9/006* (2013.01);
(Continued)

(58) Field of Classification Search
CPC ... H04L 63/0272; H04L 9/0894; H04L 9/006; H04L 63/0823; H04L 67/42;
(Continued)

(56) References Cited

U.S. PATENT DOCUMENTS 6,636,923 B1  10/2003  Meirsman et al.
8,869,259 B1  10/2014  Udupa et al.
(Continued)

OTHER PUBLICATIONS

J. R. Vic Winkler, "Securing the Cloud: Cloud Computer Security Techniques and Tactics", May 2011, Syngress Publishing, Full Text.
(Continued)

*Primary Examiner* — Bryan F Wright
(74) *Attorney, Agent, or Firm* — Baratta Law PLLC; Lawrence A. Baratta, Jr.; Ryan Odessa

(57) ABSTRACT

Systems and methods, in a lightweight connector including a processor communicatively coupled to a network interface, include connecting to a cloud-based system, via the network interface; connecting to one or more of a file share and an application, via the network interface; and providing access to a user device to the one or more of the file share and the application via a stitched connection between the network interface and the user device through the cloud-based system. The systems and methods can further include receiving a query for discovery; and responding to the query based on the one or more of the file share and the application connected thereto.

18 Claims, 16 Drawing Sheets

Related U.S. Application Data continuation-in-part of application No. 15/158,153, filed on May 18, 2016, now Pat. No. 10,375,024, which is a continuation-in-part of application No. 14/310,348, filed on Jun. 20, 2014, now Pat. No. 9,350,710.

(51) Int. Cl.

| | | |
|---|---|---|
| *H04L 9/14* | (2006.01) | |
| *H04L 9/32* | (2006.01) | |
| *H04L 9/30* | (2006.01) | |
| *H04L 9/08* | (2006.01) | |
| *H04L 9/00* | (2022.01) | |
| *H04L 67/01* | (2022.01) | |
| *H04L 67/1021* | (2022.01) | |
| *H04L 61/59* | (2022.01) | |
| *H04L 61/4511* | (2022.01) | |

(52) U.S. Cl.
CPC ............ *H04L 9/0894* (2013.01); *H04L 9/14* (2013.01); *H04L 9/30* (2013.01); *H04L 9/3263* (2013.01); *H04L 63/029* (2013.01); *H04L 63/0823* (2013.01); *H04L 63/0876* (2013.01); *H04L 67/01* (2022.05); *H04L 67/1021* (2013.01); *H04L 61/4511* (2022.05); *H04L 61/59* (2022.05)

(58) Field of Classification Search
CPC ............ H04L 67/1021; H04L 63/029; H04L 63/0876; H04L 9/14; H04L 9/3263; H04L 9/30; H04L 61/1511; H04L 61/6013; G06F 9/547
USPC ......................................... 713/156
See application file for complete search history.

(56) References Cited

U.S. PATENT DOCUMENTS

| | | | |
|---|---|---|---|
| 9,507,949 B2* | 11/2016 | Dave | H04L 67/10 |
| 2001/0020255 A1* | 9/2001 | Hofmann | H04L 29/12783 |
| | | | 719/318 |
| 2006/0074618 A1 | 4/2006 | Miller et al. | |
| 2007/0042756 A1 | 2/2007 | Perfetto et al. | |
| 2007/0214232 A1 | 9/2007 | Belimpasakis et al. | |
| 2008/0307519 A1 | 12/2008 | Curcio | |
| 2009/0129271 A1 | 5/2009 | Ramankutty et al. | |
| 2011/0173674 A1* | 7/2011 | Thomson | H04W 4/20 |
| | | | 726/1 |
| 2011/0296486 A1 | 12/2011 | Burch et al. | |
| 2011/0310899 A1 | 12/2011 | Alkhatib et al. | |
| 2012/0023325 A1 | 1/2012 | Lai | |
| 2012/0144034 A1 | 6/2012 | Mccarty | |
| 2012/0185913 A1 | 7/2012 | Martinez et al. | |
| 2012/0206319 A1* | 8/2012 | Lucero | H04N 21/41407 |
| | | | 345/1.3 |
| 2012/0246475 A1 | 9/2012 | Yoo et al. | |
| 2012/0281708 A1 | 11/2012 | Chauhan et al. | |
| 2013/0041931 A1* | 2/2013 | Brand | G06F 16/13 |
| | | | 709/203 |
| 2013/0212486 A1* | 8/2013 | Joshi | H04W 4/02 |
| | | | 715/744 |
| 2013/0347072 A1 | 12/2013 | Dinha | |
| 2014/0022586 A1 | 1/2014 | Zehler | |
| 2014/0173036 A1* | 6/2014 | Das | G06F 1/3212 |
| | | | 709/219 |
| 2014/0259093 A1 | 9/2014 | Narayanaswamy et al. | |
| 2014/0282817 A1 | 9/2014 | Singer et al. | |
| 2015/0264016 A1* | 9/2015 | Budhani | H04L 63/0823 |
| | | | 726/27 |
| 2015/0372982 A1 | 12/2015 | Herle et al. | |
| 2016/0036920 A1* | 2/2016 | Sama | H04L 63/08 |
| | | | 709/203 |

OTHER PUBLICATIONS

Stephen R. Smoot, "Private Cloud Computing: Consolidation, Virtualization, and Service-Oriented Infrastructure", Oct. 2011, Morgan Kaufman Publishers, Inc. Full Text.

* cited by examiner

SECURE APPLICATION ACCESS SYSTEMS AND METHODS VIA A LIGHTWEIGHT CONNECTOR AND A CLOUD-BASED SYSTEM

CROSS-REFERENCE TO RELATED APPLICATION(S)

The present patent/application is a continuation of U.S. patent application Ser. No. 15/986,874, filed May 23, 2018, and entitled "Clientless connection setup for cloud-based virtual private access systems and methods," which is a continuation-in-part of U.S. patent application Ser. No. 15/158,153 filed May 18, 2016 (now U.S. Pat. No. 10,375,024, issued Aug. 6, 2019), and entitled "CLOUD-BASED VIRTUAL PRIVATE ACCESS SYSTEMS AND METHODS," which is a continuation-in-part of U.S. patent application Ser. No. 14/310,348 filed Jun. 20, 2014 (now U.S. Pat. No. 9,350,710, issued May 24, 2016), and entitled "INTELLIGENT, CLOUD-BASED GLOBAL VIRTUAL PRIVATE NETWORK SYSTEMS AND METHODS," the contents of each is incorporated by reference herein.

FIELD OF THE DISCLOSURE

The present disclosure generally relates to computer networking systems and methods. More particularly, the present disclosure relates to systems and methods for clientless connection setup for cloud-based virtual private access of networked applications.

BACKGROUND OF THE DISCLOSURE

Conventionally, Information Technology (IT) departments and the like see data and computing assets in three possible domains, namely (1) internal networks, (2) private clouds, and (3) public clouds or Software-as-a-Service (SaaS). As computing moves to the cloud, users may access internal data such as through database applications, etc. through a Virtual Private Network (VPN), access their own documents via a public cloud (e.g., Microsoft OneDrive, Google Drive, Dropbox, Apple iCloud, Amazon web services, Microsoft Azure, Box, etc.), etc. This distribution of data and computing assets makes it very difficult for an enterprise user to connect seamlessly to applications ("apps") in these domains (without regard to their topology/connectivity/location), and, for the IT administrator, it is difficult to enforce a single, coherent set of policies across these three domains. Note, that the enterprise users can be nomadic in nature or be situated in untrusted branch offices. The current state of the art requires the IT admin to hairpin all end-user traffic back to the corporate data center via a traditional VPN (e.g., Secure Sockets Layer (SSL) or Internet Protocol Security (IPsec))—and then jump to the other domains via point-to-point dedicated VPNs. This approach increases the incoming and outgoing bandwidth to the corporate data center linearly with every new branch or nomadic user. This increase in traffic is completely unnecessary—since most of the inbound VPN traffic will go out through a dedicated VPN to the private cloud.

A second alternative is to install a Firewall and VPN server in every private cloud and setup application routing rules—so that apps can talk between the domains and across multiple private cloud instances. Disadvantageously, this greatly increases administrative complexity and adds multiple points of security weakness. Thus, there is a need in the market for a "Global VPN" that leverages the cloud to maintain a single secure VPN to the cloud—and direct traffic to various enterprises assets per authentication and security policies—and in particular, provide a safe path from the cloud back to enterprise data center.

Enterprises and the like deploy private, internal applications which can include, for example, financial or personal information, intellectual property, and other valuable assets. These applications may include a small percentage of overall network traffic, but represents some of the most critical data. Again, conventional access approaches, outside internal networks, utilize VPNs which enable remote users to access the network. These solutions include VPN clients on user devices and a VPN termination on the internal network. Also, as applications move to the cloud, there may be site-to-site VPN tunnels from the data centers to the cloud. To increase reachability and performance, multiple data centers and load balancers are used, resulting in high-performance, but at the expense of cost, maintenance, complexity, and scalability. The conventional paradigm is remote application access is really network access remotely. This has caused major security breaches, specifically a user only needs to access the application, but instead is given full network access. That is, VPNs extend the network perimeter to encompass the remote user, definitely overkill for what is actually needed.

BRIEF SUMMARY OF THE DISCLOSURE

A virtual private access method implemented in a clientless manner on a user device includes receiving a request to access resources from a Web browser on the user device at an exporter in a cloud system, wherein the resources are located in one of a public cloud and an enterprise network and the user device is remote therefrom on the Internet; performing a series of connections between the exporter and i) the Web browser and ii) centralized components including a crypto service, database, cookie store, and Security Assertion Markup Language (SAML) Service Provider (SP) component to authenticate a user of the user device for the resources; and, subsequent to authentication, exchanging data between the Web browser and the resources through the exporter, wherein the exporter has a first secure tunnel to the Web browser and a second secure tunnel to the resources. The virtual private access method can further include, prior to the request, uploading a private and public key to the centralized components via an Application Programming Interface (API); and encrypting and storing the private key in the database.

The request can be sent to an address of the resources and changed via a Domain Name System (DNS) server to an address of the exporter. The address of the exporter can resolve to a nearest cloud node. The user device can send the request via Transmission Control Protocol (TCP) port 80 and after the receiving, the exporter redirects the user device to TCP port 443 based on determining an address of the resources relates to virtual private access. The exporter can utilize Server Name Indication (SNI) to determine a certificate to present, wherein the certificate is encrypted and obtained from the database and the crypto service decrypts the certificate and authenticates the exporter. The virtual private access method can further include performing the series of connections to determine a cookie for the Web browser to use for clientless authentication. The cookie can be determined by the SAML SP component based an assertion generated by an Identity Provider.

In another exemplary embodiment, a cloud system adapted to implement virtual private access with a user device in a clientless manner includes one or more cloud nodes communicatively coupled to one another; wherein each of the one or more cloud nodes includes one or more processors and memory storing instructions that, when executed, cause the one or more processors to receive a request to access resources from a Web browser on the user device, wherein the resources are located in one of a public cloud and an enterprise network and the user device is remote therefrom on the Internet; perform a series of connections between i) the Web browser and ii) centralized components including a crypto service, database, cookie store, and Security Assertion Markup Language (SAML) Service Provider (SP) component to authenticate a user of the user device for the resources; and, subsequent to authentication, exchange data between the Web browser and the resources through the cloud node, wherein the cloud node has a first secure tunnel to the Web browser and a second secure tunnel to the resources.

In a further exemplary embodiment, a non-transitory computer-readable medium including instructions that, when executed, cause a processor to perform the steps of receiving a request to access resources from a Web browser on a user device at an exporter in a cloud system, wherein the resources are located in one of a public cloud and an enterprise network and the user device is remote therefrom on the Internet; performing a series of connections between the exporter and i) the Web browser and ii) centralized components including a crypto service, database, cookie store, and Security Assertion Markup Language (SAML) Service Provider (SP) component to authenticate a user of the user device for the resources; and, subsequent to authentication, exchanging data between the Web browser and the resources through the exporter, wherein the exporter has a first secure tunnel to the Web browser and a second secure tunnel to the resources.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods for cloud-based virtual private access of networked applications are described. At a high level, the systems and methods dynamically creates a connection through a secure tunnel between three entities: an end-point, a cloud, and an on-premises redirection proxy. The connection between the cloud and on-premises proxy is dynamic, on-demand and orchestrated by the cloud. A key feature of the systems and methods is its security at the edge—there is no need to punch any holes in the existing on-premises firewall. The redirection proxy inside the enterprise (on premises) "dials out" and connects to the cloud as if too were an end-point. This on-demand dial-out capability and tunneling authenticated traffic back to the enterprise is a key differentiator of the systems and methods.

The paradigm of the virtual private access systems and methods is to give users network access to get to an application, not to the entire network. If a user is not authorized to get the application, the user should not be able to even see that it exists, much less access it. The virtual private access systems and methods provide a new approach to deliver secure access by decoupling applications from the network, instead providing access with a lightweight software connector, in front of the applications, an application on the user device, a central authority to push policy, and a cloud to stitch the applications and the software connectors together, on a per-user, per-application basis.

With the virtual private access, users can only see the specific applications allowed by policy. Everything else is "invisible" or "dark" to them. Because the virtual private access separates the application from the network, the physical location of the application becomes irrelevant—if applications are located in more than one place, the user is automatically directed to the instance that will give them the best performance. The virtual private access also dramatically reduces configuration complexity such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end users and enterprises.

Exemplary Cloud System Architecture

Figure 1:
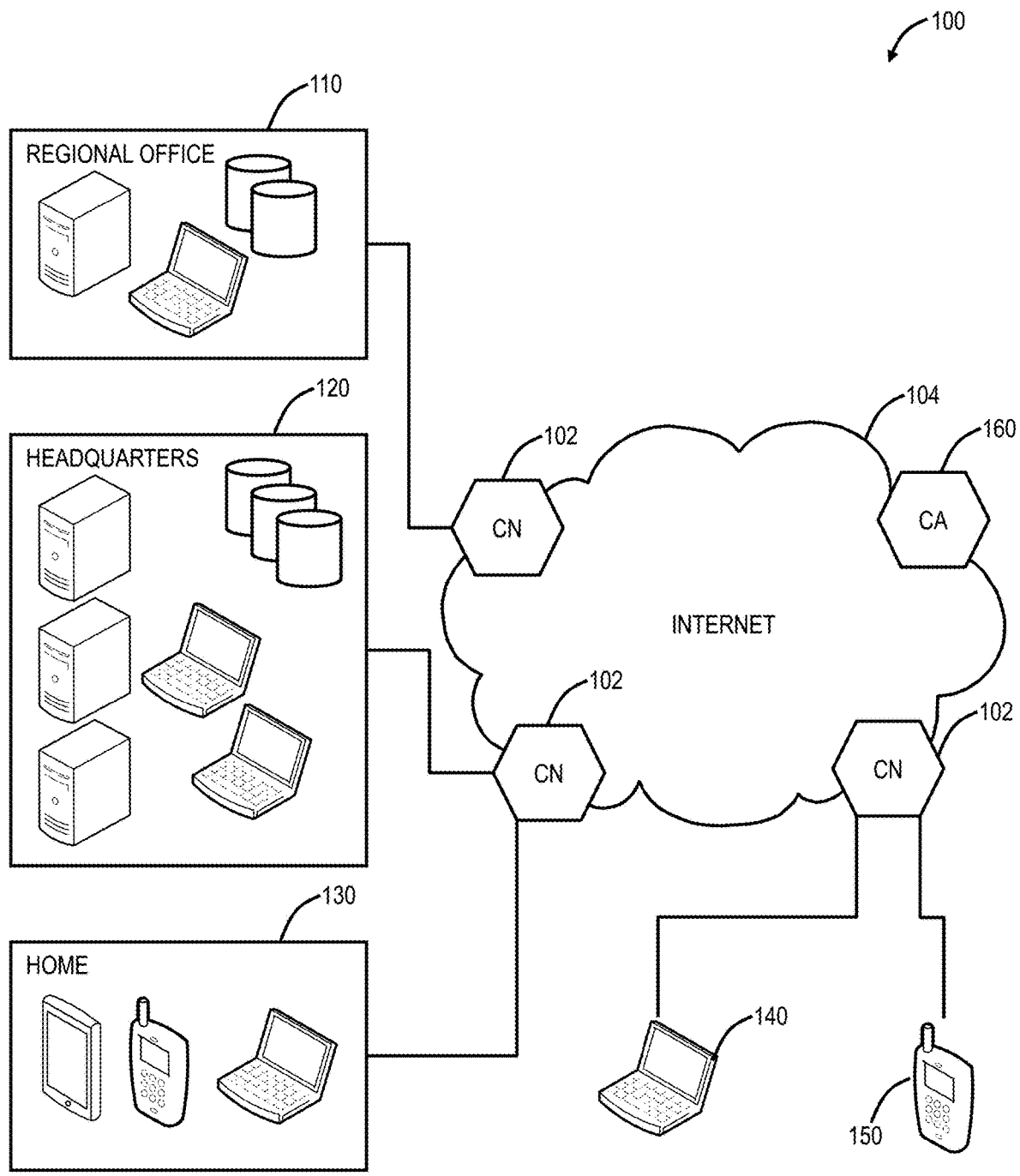
FIG. 1 is network diagram of a cloud system for use with the systems and methods described herein.
Figure 2:
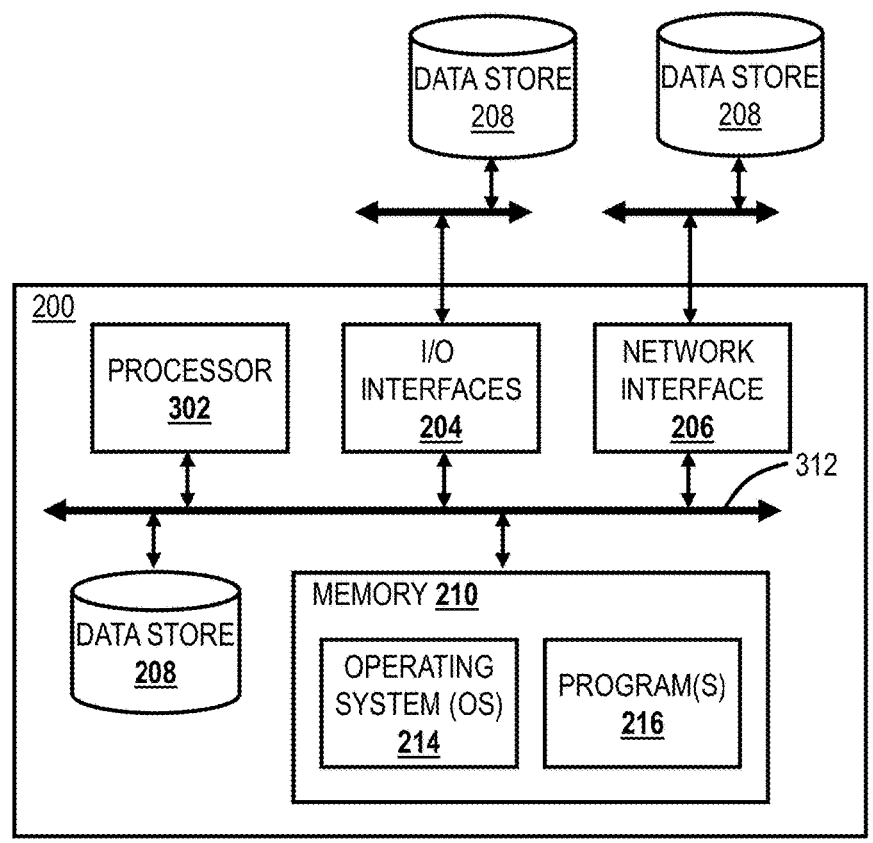
FIG. 2 is a block diagram of a server which may be used in the cloud system of FIG. 1 or standalone.

Referring to FIG. 1, in an exemplary embodiment, a cloud system 100 is illustrated for use with the systems and methods described herein. The cloud system 100 includes one or more cloud nodes (CN) 102 communicatively coupled to the Internet 104. The cloud nodes 102 may be implemented as a server 200 (as illustrated in FIG. 2), or the like. That is, the cloud system 100 may be a distributed security system. In the cloud system 100, traffic from various locations (and various devices located therein) such as a regional office 110, headquarters 120, various employee's homes 130, mobile laptop 140, and mobile device 150 can be monitored or redirected to the cloud through the cloud nodes 102. That is, each of the locations 110, 120, 130, 140, 150 is communicatively coupled to the Internet 104 and can be monitored by the cloud nodes 102. The cloud system 100 may be configured to perform various functions such as spam filtering, uniform resource locator (URL) filtering, antivirus protection, bandwidth control, data loss prevention, zero-day vulnerability protection, web 2.0 features, and the like. In an exemplary embodiment, the cloud system 100 may be viewed as Security-as-a-Service through the cloud. Existing cloud-based distributed security systems perform inline processing where all traffic is redirected through the cloud for proactive monitoring. In the various exemplary embodiments described herein, DNS is utilized for a less intrusive mechanism for a cloud-based distributed security system.

In an exemplary embodiment, the cloud system 100 can be configured to provide mobile device security and policy systems and methods. The mobile device 150 may be the mobile device 300, and may include common devices such as smartphones, laptops, tablets, netbooks, ultra-books, personal digital assistants, MP3 players, cell phones, e-book readers, and the like. The cloud system 100 is configured to provide security and policy enforcement for devices including the mobile devices 150 in the cloud. Advantageously, the cloud system 100 avoids platform specific security apps on the mobile devices 150, forwards web traffic through the cloud system 100, enables network administrators to define policies in the cloud, and enforces/cleans traffic in the cloud prior to delivery to the mobile devices 150. Further, through the cloud system 100, network administrators may define user centric policies tied to users, not devices, with the policies being applied regardless of the device used by the user. The cloud system 100 provides 24×7 security with no need for updates as the cloud system 100 is always up-to-date with current threats and without requiring device signature updates. Also, the cloud system 100 enables multiple enforcement points, centralized provisioning and logging, automatic traffic routing to a nearest cloud node 102, geographical distribution of the cloud nodes 102, policy shadowing of users which is dynamically available at the cloud nodes, etc.

Generally, the cloud system 100 may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud system 100 is illustrated herein as one exemplary embodiment of a cloud-based system, and those of ordinary skill in the art will recognize the systems and methods contemplate operation on any cloud based system.

Exemplary Server Architecture

Referring to FIG. 2, in an exemplary embodiment, a block diagram illustrates a server 200 which may be used in the system 100, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Figure 3:
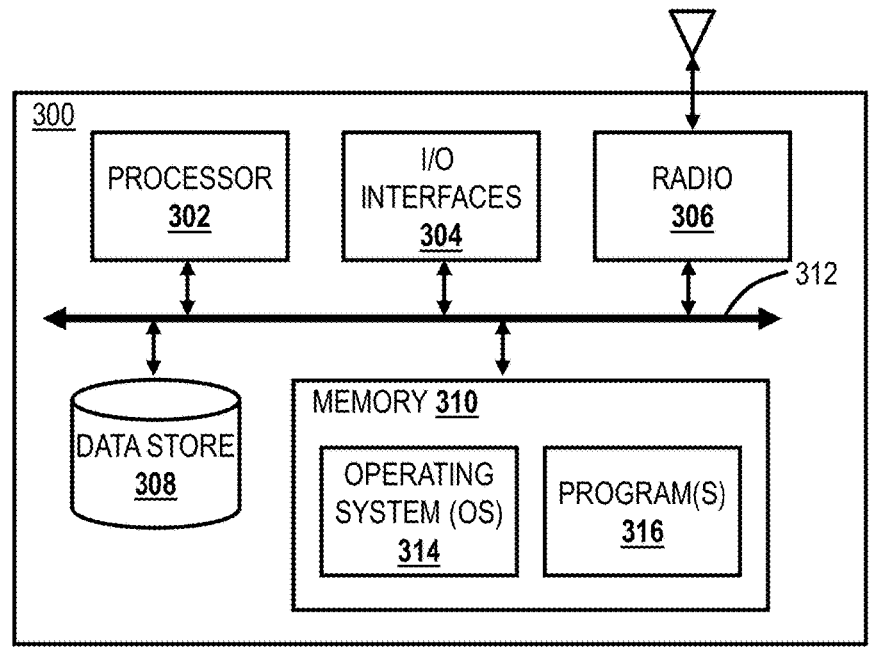
FIG. 3 is a block diagram of a mobile device which may be used in the cloud system of FIG. 1 or with any other cloud-based system.

Referring to FIG. 3, in an exemplary embodiment, a block diagram illustrates a mobile device 300, which may be used in the system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the memory 310, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the memory 310. Additionally, the I/O interfaces 304 may further include an imaging device, i.e. camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network.

VPN Architecture

Figure 4:
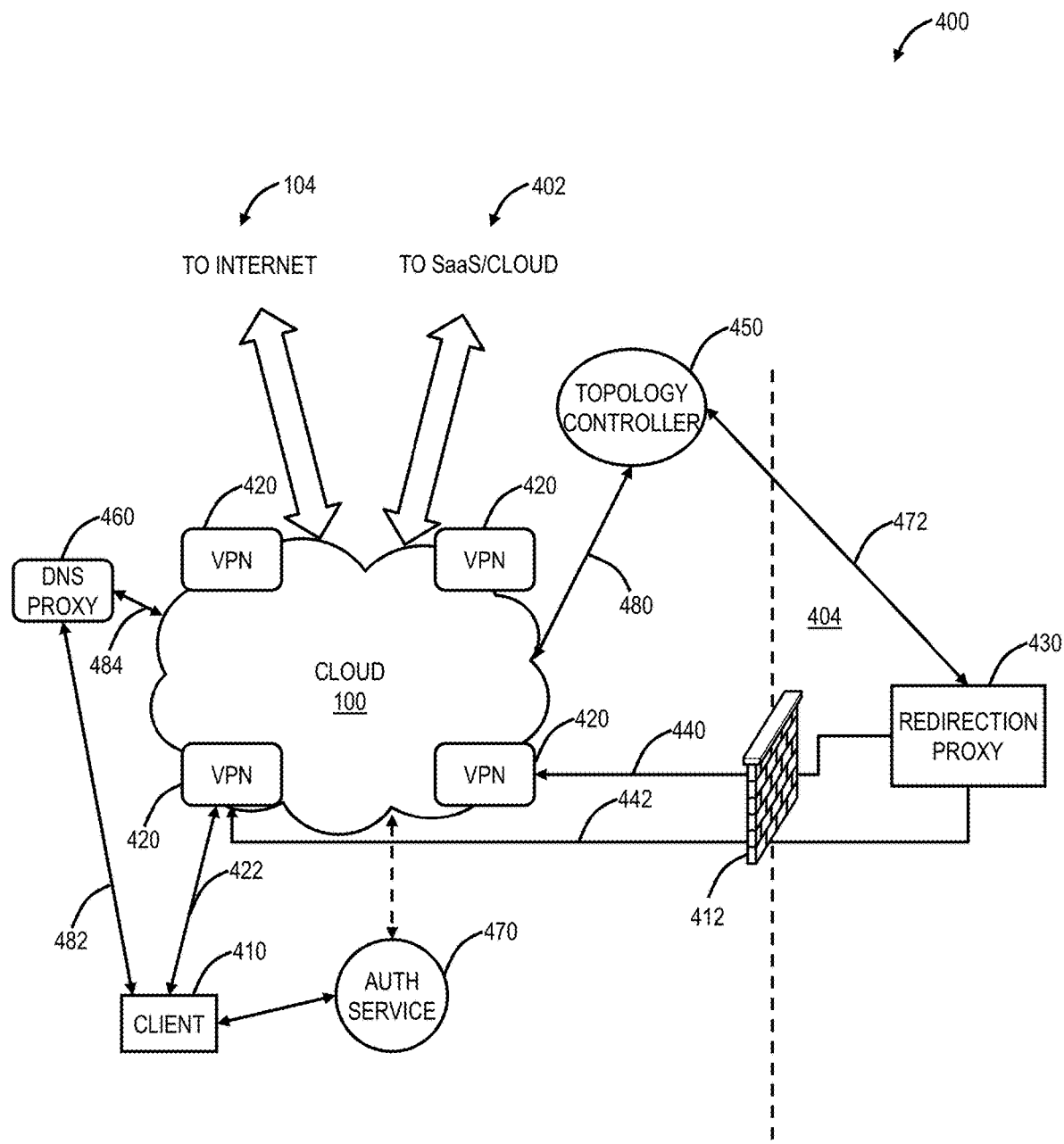
FIG. 4 is a network diagram of a VPN architecture for an intelligent, cloud-based global VPN.

Referring to FIG. 4, in an exemplary embodiment, a network diagram illustrates a VPN architecture 400 for an intelligent, cloud-based global VPN. For illustration purposes, the VPN architecture 400 includes the cloud system 100, the Internet 104, SaaS/public cloud systems 402, and an enterprise 404. The VPN architecture 400 also includes a client 410 which can include any computing device/platform connecting to the cloud system 100, the Internet 104, the SaaS/public cloud systems 402, and the enterprise 404. The VPN architecture 400 includes a single client for illustration purposes, but those of ordinary skill in the art will recognize that the VPN architecture 400 contemplates a plurality of client devices. The client 410 can be a nomadic user, a regional/branch office, etc. That is, the client 410 can be any user of the enterprise 404 that is physically located outside a firewall 412 associated with the enterprise 404. The SaaS/public cloud systems 402 can include any systems containing computing and data assets in the cloud such as, for example, Microsoft OneDrive, Google Drive, Dropbox, Apple iCloud, Customer Relationship Management (CRM) systems, Sales management systems, etc. The enterprise 404 includes local computing and data assets behind the firewall 412 for additional security on highly confidential assets or legacy assets not yet migrated to the cloud.

The client 410 needs to access the Internet 104, the SaaS/public cloud systems 402, and the enterprise 404. Again, conventionally, the solution for secure communication, the client 410 has a VPN connection through the firewall 412 where all data is sent to the enterprise 404 including data destined for the Internet 104 or the SaaS/public cloud systems 402. Furthermore, this VPN connection dials into the enterprise 404. The systems and methods described herein provide the VPN architecture 400 which provides a secure connection to the enterprise 404 without bringing all traffic, e.g., traffic for the Internet 104 or the SaaS/public cloud systems 402, into the enterprise 404 as well as removing the requirement for the client 410 to dial into the enterprise 404.

Instead of the client 410 creating a secure connection through the firewall 412, the client 410 connects securely to a VPN device 420 located in the cloud system 100 through a secure connection 422. Note, the cloud system 100 can include a plurality of VPN devices 420. The VPN architecture 400 dynamically routes traffic between the client 410 and the Internet 104, the SaaS/public cloud systems 402, and securely with the enterprise 404. For secure access to the enterprise 404, the VPN architecture 400 includes dynamically creating connections through secure tunnels between three entities: the VPN device 420, the cloud, and an on-premises redirection proxy 430. The connection between the cloud system 100 and the on-premises redirection proxy 430 is dynamic, on-demand and orchestrated by the cloud system 100. A key feature of the systems and methods is its security at the edge of the cloud system 100—there is no need to punch any holes in the existing on-premises firewall 412. The on-premises redirection proxy 430 inside the enterprise 404 "dials out" and connects to the cloud system 100 as if too were an end-point via secure connections 440, 442. This on-demand dial-out capability and tunneling authenticated traffic back to the enterprise 404 is a key differentiator.

The VPN architecture 400 includes the VPN devices 420, the on-premises redirection proxy 430, a topology controller 450, and an intelligent DNS proxy 460. The VPN devices 420 can be Traffic (VPN) distribution servers and can be part of the cloud system 100. In an exemplary embodiment, the cloud system 100 can be a security cloud such as available from Zscaler, Inc. (www.zscaler.com) performing functions on behalf of every client that connects to it: a) allowing/denying access to specific Internet sites/apps—based on security policy and absence/presence of malware in those sites, and b) set policies on specific SaaS apps and allowing/denying access to specific employees or groups.

The on-premises redirection proxy 430 is located inside a perimeter of the enterprise 404 (inside the private cloud or inside the corporate data center—depending on the deployment topology). It is connected to a local network and acts as a "bridge" between the clients 410 outside the perimeter and apps that are inside the perimeter through the secure connections 440, 442. But, this "bridge" is always closed—it is only open to the clients 410 that pass two criteria: a) they must be authenticated by an enterprise authentication service 470, and b) the security policy in effect allows them access to "cross the bridge".

When the on-premises redirection proxy 430 starts, it establishes a persistent, long-lived connection 472 to the topology controller 450. The topology controller 450 connects to the on-premises redirection proxy 430 through a secure connection 472 and to the cloud system 100 through a secure connection 480. The on-premises redirection proxy 430 waits for instruction from the topology controller 450 to establish tunnels to specific VPN termination nodes, i.e., the VPN devices 420, in the cloud system 100. The on-premises redirection proxy 430 is most expediently realized as custom software running inside a virtual machine (VM). The topology controller 450, as part of the non-volatile data for each enterprise, stores the network topology of a private network of the enterprise 404 including, but not limited to, internal domain name(s), subnet(s) and other routing information.

The DNS proxy 460 handles all domain name to Internet Protocol (IP) Address resolution on behalf of end points (clients). These end points are end user computing devices—such as mobile devices, laptops, tablets, etc. The DNS proxy 460 consults the topology controller 450 to discern packets that must be sent to the Internet 104, the SaaS/public cloud systems 402, vs. the enterprise 404 private network. This decision is made by consulting the topology controller 450 for information about a company's private network and domains. The DNS proxy 460 is connected to the client 410 through a connection 482 and to the cloud system 100 through a connection 484.

The VPN device 420 is located in the cloud system 100 and can have multiple points-of-presence around the world. If the cloud system 100 is a distributed security cloud, the VPN device 420 can be located with enforcement nodes. In general, the VPN device 420 can be implemented as software instances on the cloud nodes 102, as a separate virtual machine on the same physical hardware as the cloud nodes 102, or a separate hardware device such as the server 200, but part of the cloud system 100. The VPN device 420 is the first point of entry for any client wishing to connect to the Internet 104, SaaS apps, or the enterprise private network. In addition to doing traditional functions of a VPN server, the VPN device 420 works in concert with the topology controller 450 to establish on-demand routes to the on-premises redirection proxy 430. These routes are setup for each user on demand. When the VPN device 420 determines that a packet from the client 410 is destined for the enterprise private network, it encapsulates the packet and sends it via a tunnel between the VPN device 420 and the on-premises redirection proxy 430. For packets meant for the Internet 104 or SaaS clouds, the VPN device 420 can forwards it to the existing Enforcement Nodes (EN) such as the cloud nodes 102—to continue processing as before, or send directly to the Internet 104 or SaaS clouds.

VPN Method

Figure 5:
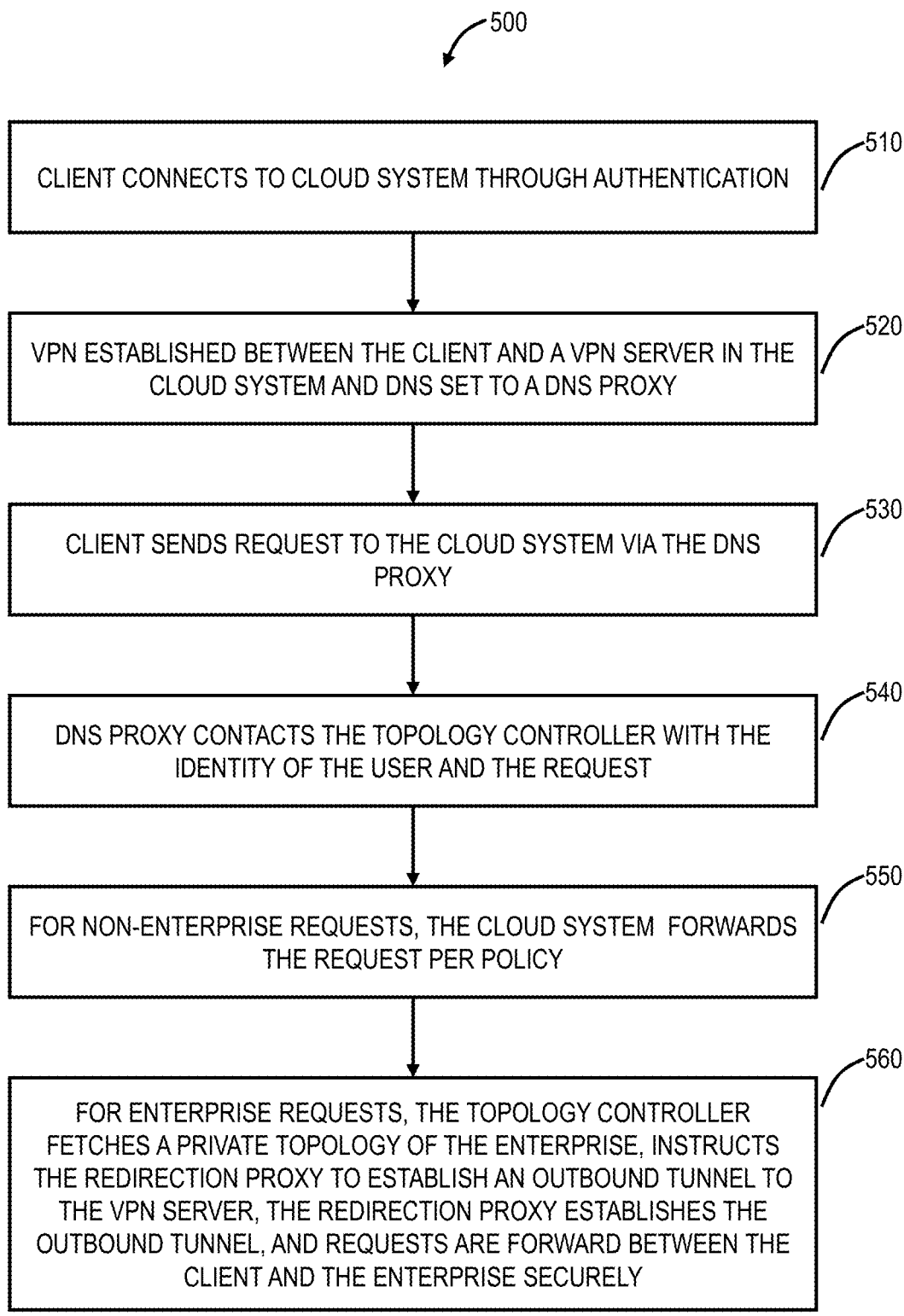
FIG. 5 is a flowchart of a VPN method for an intelligent, cloud-based global VPN.

Referring to FIG. 5, in an exemplary embodiment, a flowchart illustrates a VPN method 500 for an intelligent, cloud-based global VPN. The VPN method 500 can be implemented through the VPN architecture 400. The VPN method 500 includes the client 410 connecting to the cloud system 100 through authentication (step 510). Once the authentication is complete, a VPN is established between the client 410 and a VPN server in the cloud system 100 and DNS for the client 410 is set to a DNS proxy 460 (step 520). Now, the client 410 has a secure VPN connection to the cloud system 100. Subsequently, the client 410 sends a request to the cloud system 100 via the DNS proxy 460 (step 530). Here, the request can be anything—request for the enterprise 404, the Internet 104, the SaaS/public cloud systems 402, etc. The DNS proxy 460 contacts the topology controller 450 with the identity of the user and the request (step 540). That is, whenever the client 410 wishes to reach a destination (Internet, Intranet, SaaS, etc.), it will consult the DNS proxy 460 to obtain the address of the destination.

For non-enterprise requests, the cloud system 100 forwards the request per policy (step 550). Here, the cloud system 100 can forward the request based on the policy associated with the enterprise 404 and the client 410. With the identity of the user and the enterprise they belong to, the VPN server will contact the topology controller 450 and pre-fetch the enterprise private topology. For enterprise requests, the topology controller 450 fetches a private topology of the enterprise 404, instructs the redirection proxy 430 to establish an outbound tunnel to the VPN server, the redirection proxy 430 establishes the outbound tunnel, and requests are forward between the client 410 and the enterprise 404 securely (step 560). Here, the DNS proxy 460 works with the topology controller 450 to determine the local access in the enterprise 404, and the topology controller 450 works with the redirection proxy 430 to dial out a secure connection to the VPN server. The redirection proxy 430 establishes an on-demand tunnel to the specific VPN server so that it can receive packets meant for its internal network.

Global VPN Applications

Advantageously, the systems and methods avoid the conventional requirement of VPN tunneling all data into the enterprise 404 and hair-pinning non-enterprise data back out. The systems and methods also allow the enterprise 404 to have remote offices, etc. without requiring large hardware infrastructures—the cloud system 100 bridges the clients 410, remote offices, etc. to the enterprise 404 in a seamless manner while removing the requirement to bring non-enterprise data through the enterprise 404. This recognizes the shift to mobility in enterprise applications. Also, the VPN tunnel on the client 410 can leverage and use existing VPN clients available on the mobile devices 300. The cloud system 100, through the VPN architecture 400, determines how to route traffic for the client 410 efficiently—only enterprise traffic is routed securely to the enterprise 404. Additionally, the VPN architecture 400 removes the conventional requirement of tunneling into the enterprise 404 which can be an opportunity for security vulnerabilities. Instead, the redirection proxy 430 dials out of the enterprise 404.

The systems and methods provide, to the end user (enterprise user), a single, seamless way to connect to Public and Private clouds—with no special steps needed to access one vs. the other. To the IT Admin, the systems and methods provide a single point of control and access for all users—security policies and rules are enforced at a single global, cloud chokepoint—without impacting user convenience/performance or weakening security.

Distributed, Cloud-Based Security

Figure 6:
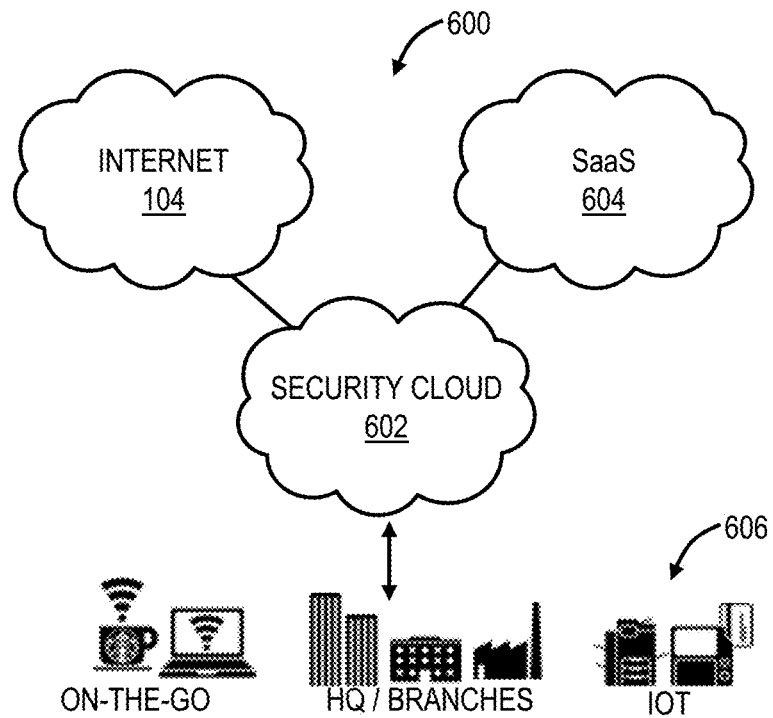
FIG. 6 is a network diagram of a network with a security cloud communicatively coupled to the Internet and SaaS applications.

Referring to FIG. 6, in an exemplary embodiment, a network diagram illustrates a network 600 with a security cloud 602 communicatively coupled to the Internet 104 and SaaS applications 604. Various users 606, including, for example, users "on-the-go" or remote, mobile, users located on internal networks in headquarters or branch offices, user devices for the Internet-of-Things (IOT), and the like, can connect to the Internet 104 and the SaaS applications 604 via the security cloud 602. The security cloud 602 can provide proactive monitoring to proactively detect and preclude the distribution of security threats, e.g., malware, spyware, viruses, email spam, etc., as well as enforce policy and access restrictions, e.g., Data Leakage Prevention (DLP), content filtering, etc. The use of the security cloud 602 for monitoring can be device-independent, location-independent, as well as avoid the need for appliances or hardware deployment or heavy clients on user devices. Further, an advantage of the security cloud 602 is multi-tenant, enabling zero-hour detection of threats, and the like. Importantly, the security cloud 602 has per-user, per-device visibility. An example of the security cloud 602 is provided by the assignee of this application, Zscaler, Inc. of San Jose, Calif.

Virtual Private Access Via the Cloud

Figure 7:
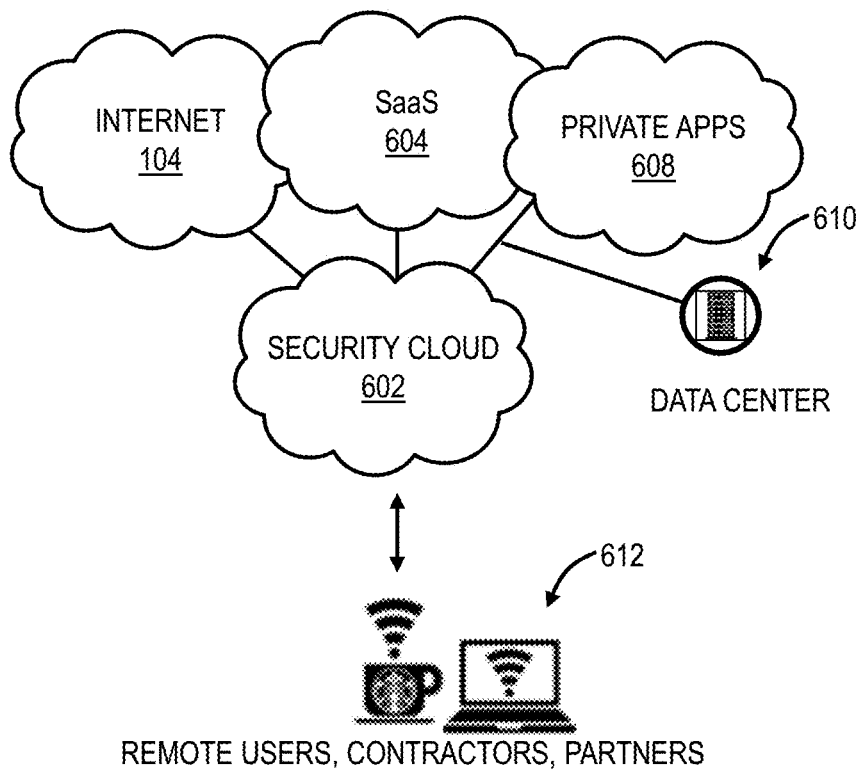
FIG. 7 is a network diagram of the network of FIG. 6 with the security cloud and with private applications and data centers connected thereto to provide virtual private access through the security cloud.

Referring to FIG. 7, in an exemplary embodiment, a network diagram illustrates the network 600 with the security cloud 602 and with private applications 608 and data centers 610 connected thereto to provide virtual private access through the security cloud 602. In an exemplary aspect, the virtual private access described herein leverages the security cloud 602 to enable various users 612 including remote users, contractors, partners, etc., i.e., anyone who needs access to the private applications 608 and the data centers 610 access, without granting unfettered access to the internal network, without requiring hardware or appliances, and in a seamless manner from the users' 612 perspective. The private applications 608 include applications dealing with financial data, personal data, medical data, intellectual property, records, etc., that is the private applications 608 are available on an enterprise's network, but not available remotely except conventionally via VPN access. Examples of the private applications 608 can include Customer Relationship Management (CRM), sales automation, financial applications, time management, document management, etc.

Figure 8:
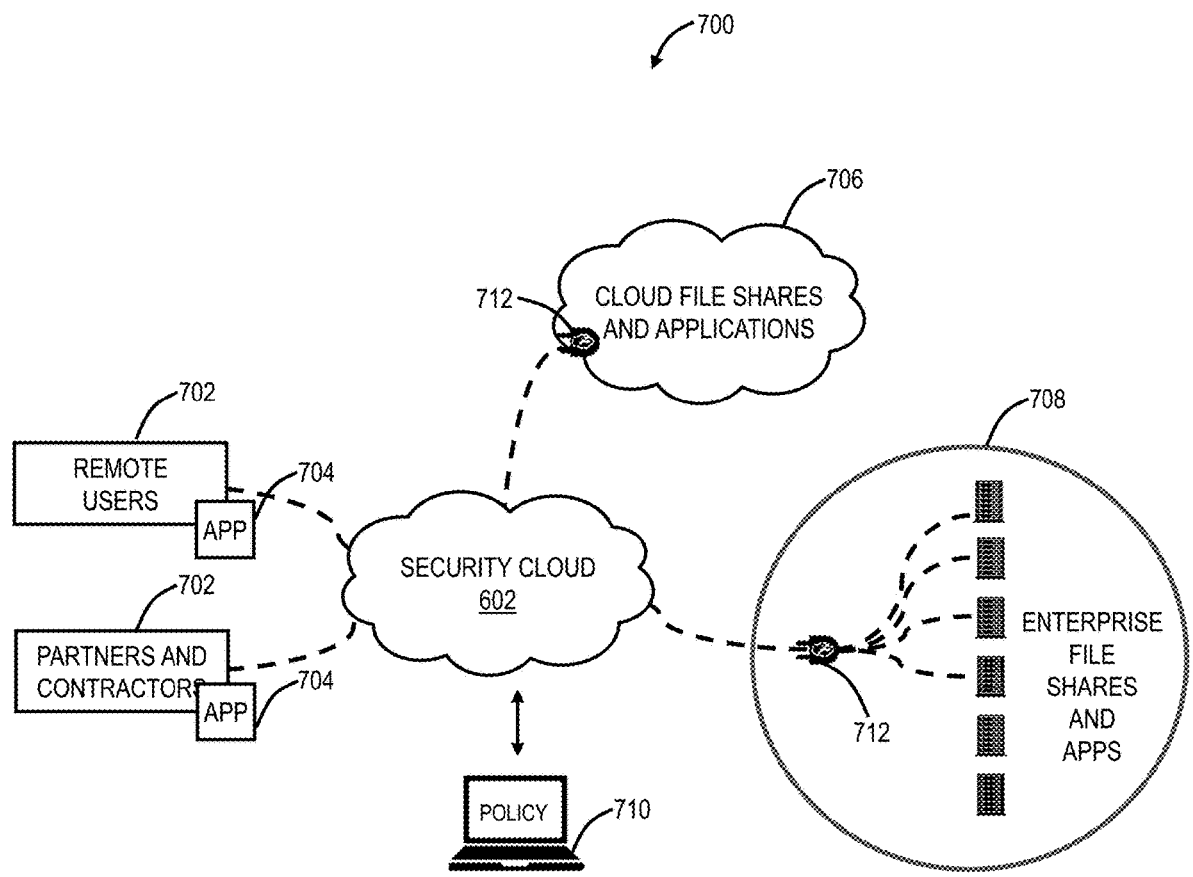
FIG. 8 is a network diagram of a virtual private access network using the security cloud.

Referring to FIG. 8, in an exemplary embodiment, a network diagram illustrates a virtual private access network 700 using the security cloud 602. Of note, while described with reference to the security cloud 602, virtual private access is also contemplated in the cloud 100 or any other distributed system. The virtual private access network 700 includes users 702 with an application 704 on their associated user devices (phones, tablets, laptops, etc.). The users 702 can be remote users, partners, contractors, etc., i.e., anyone who needs remote access to cloud file shares and applications 706 and/or enterprise file shares and applications 708. The file shares and applications 706, 708 can be the private applications 608, and can be generally referred to as resources. The cloud file shares and applications 706 are located in the cloud such as in the data center 610 whereas the enterprise file shares and applications 708 are located within an enterprise's internal network. Note, while described as file shares and applications 706, 708, each could only be file shares or applications, i.e., these are generalized to denote something accessible by users. Again, conventional access techniques rely on VPNs to the data center 610 or the enterprise's internal network, with all of the resulting issues previously discussed. Also, the virtual private access network 700 includes a central authority 710 for policy configuration and the like. The virtual private access network 700 further includes lightweight connectors 712 at the file shares and applications 706, 708.

The virtual private access is a new technique for the users 702 to access the file shares and applications 706, 708, without the cost, hassle or security risk of VPNs, which extend network access to deliver app access. The virtual private access decouples private internal applications from the physical network to enable authorized user access to the file shares and applications 706, 708 without the security risk or complexity of VPNs. That is, virtual private access takes the "Network" out of VPNs.

In the virtual private access network 700, the users 702, the file shares and applications 706, 708, and the central authority 710 are communicatively coupled to the security cloud 602, such as via the Internet 104 or the like. On the client side, at the users 702, the applications 704 provision both secure remote access and optionally accessibility to the security cloud 602. The application 704 establishes a connection to the closest cloud node 102 in the security cloud 602 at startup and may not accept incoming requests.

At the file shares and applications 706, 708, the lightweight connectors 712 sit in front of the applications. The lightweight connectors 712 become the path to the file shares and applications 706, 708 behind it, and connect only to the security cloud 602. The lightweight connectors 712 can be lightweight, ephemeral binary, such as deployed as a virtual machine, to establish a connection between the file shares and applications 706, 708 and the security cloud 602, such as via the closest cloud node 102. The lightweight connectors 712 do not accept inbound connections of any kind, dramatically reducing overall threat surface. The lightweight connectors 712 can be enabled on a standard VMware platform; additional lightweight connectors 712 can be created in less than 5 seconds to handle additional application instances. By not accepting inbound connections, the lightweight connectors 712 make the file shares and applications 706, 708 "dark," removing a significant threat vector.

Policy is established and pushed by policy engines in the central authority 710, such as via a distributed cluster of multi-tenant policy engines that provide a single interface for all policy creation. Also, no data of any kind transits the policy engines. The cloud nodes 102 in the security cloud stitch connections together, between the users 702 and the file shares and applications 706, 708, without processing traffic of any kind. When the user 702 requests an application in the file shares and applications 706, 708, the policy engine delivers connection information to the application 704 and app-side cloud nodes 102 which includes the location of a single cloud nodes 102 to provision the client/app connection. The connection is established through the cloud nodes 102, and is encrypted with a combination of the customer's client and server-side certificates. While the cloud nodes 102 provision the connection, they do not participate in the key exchange, nor do they have visibility into the traffic flows.

Advantageously, the virtual private access provides increased security in that the file shares and applications 706, 708 are visible only to the users 702 that are authorized to access them; unauthorized users are not able to even see them. Because application access is provisioned through the security cloud 602, rather than via a network connection, the virtual private access makes it impossible to route back to applications. The virtual private access is enabled using the application 704, without need to launch or exit VPN clients. The application access just works in the background enabling application-specific access to individual contractors, business partners or other companies, i.e., the users 702.

The virtual private access provides capital expense (CAPEX) and operating expense (OPEX) reductions as there is no hardware to deploy, configure, or maintain. Legacy VPNs can be phased out. Internal IT can be devoted to enabling business strategy, rather than maintaining network "plumbing." Enterprises can move apps to the cloud on their schedule, without the need to re-architect, set up site-to-site VPNs or deliver a substandard user experience.

The virtual private access provides easy deployment, i.e., put lightweight connectors 712 in front of the file shares and applications 706, 708, wherever they are. The virtual private access will automatically route to the location that delivers the best performance. Wildcard app deployment will discover applications upon request, regardless of their location, then build granular user access policies around them. There is no need for complex firewall rules, Network Address Translation issues or policy juggling to deliver application access. Further, the virtual private access provides seamless integration with existing Single Sign-On (SSO) infrastructure.

Figure 9:
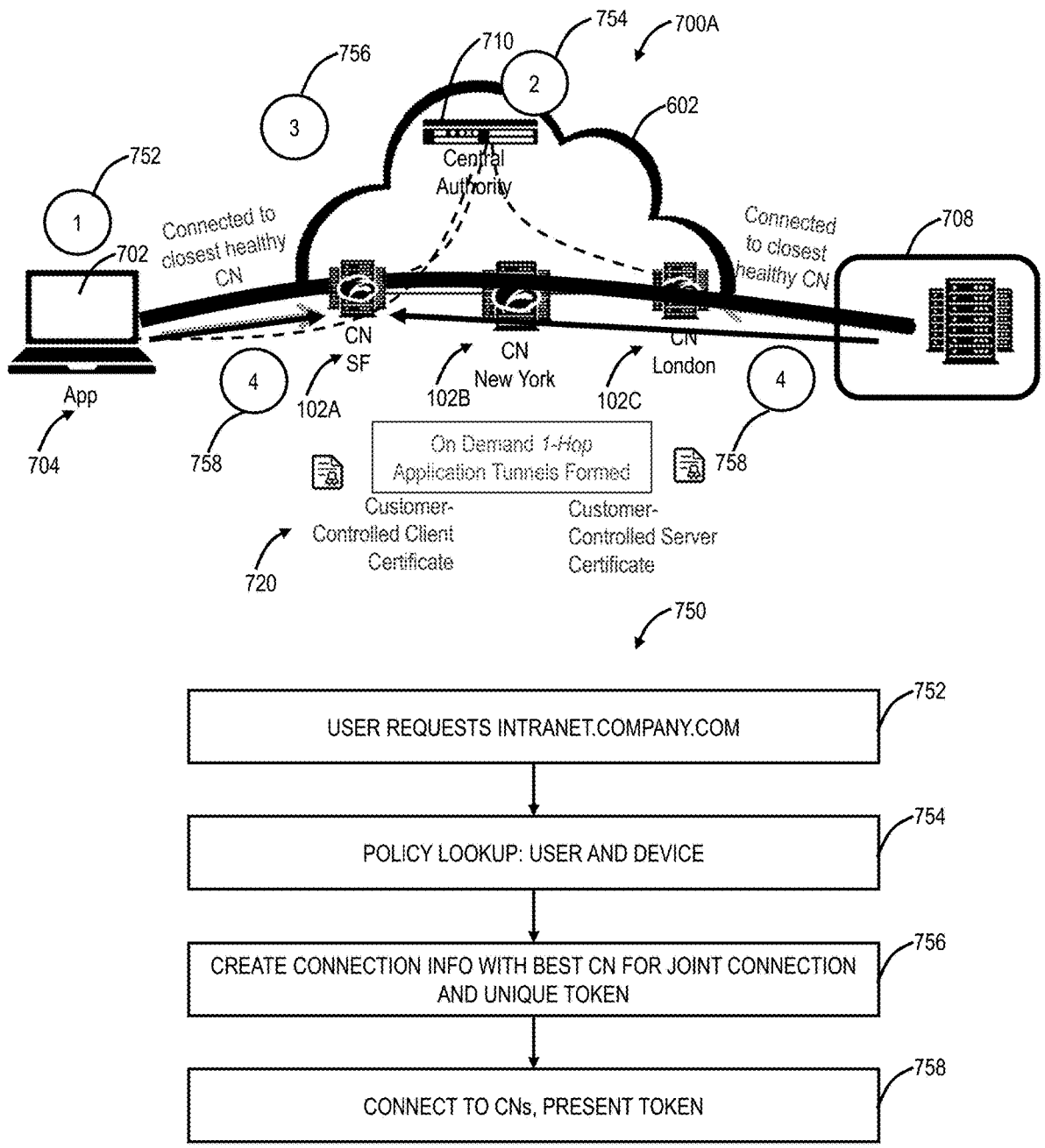
FIG. 9 is a network diagram of a virtual private access network and a flowchart of a virtual private access process implemented thereon.

Referring to FIG. 9, in an exemplary embodiment, a network diagram illustrates a virtual private access network 700A and a flowchart of a virtual private access process 750 implemented thereon. The security cloud 602 includes three cloud nodes 102A, 102B, 102C, assume for illustration purposes in San Francisco, New York, and London, respectively. The user 702 has the application 704 executing on the user device which is communicatively coupled to the cloud node 102A. The enterprise file share and application 708 is communicatively coupled to the cloud node 102C. Note, there can be direct connectivity between the cloud nodes 102A, 102C, the cloud nodes 102A, 102C can connect through the cloud node 102B, or both the user 702 and the enterprise file share and application 708 can be connected to a same cloud node. That is, the architecture of the security cloud 602 can include various implementations.

The virtual private access process 750 is described with reference to both the user 702, the security cloud 602, and the enterprise file share and application 708. First, the user 702 is executing the application 704 on the user device, in the background. The user 702 launches the application 704 and can be redirected to an enterprise ID provider or the like to sign on, i.e., a single sign on, without setting up new accounts. Once authenticated, Public Key Infrastructure (PKI) certificate 720 enrollment occurs, between the user 702 and the cloud node 102A. With the application 704 executing on the user device, the user 702 makes a request to the enterprise file share and application 708, e.g., intranet.company.com, crm.company.com, etc. (step 752). Note, the request is not limited to web applications and can include anything such as remote desktop or anything handling any static Transmission Control Protocol (TCP) or User Datagram Protocol (UDP) applications.

This request is intercepted by the cloud node 102A and redirected to the central authority 710 which performs a policy lookup for the user 702 and the user device (step 754), transparent to the user 702. The central authority 710 determines if the user 702 and the user device are authorized for the enterprise file share and application 708. Once authorization is determined, the central authority 710 provides information to the cloud nodes 102A, 102B, 102C, the application 704, and the lightweight connectors 712 at the enterprise file share and application 708, and the information can include the certificates 720 and other details necessary to stitch secure connections between the various devices. Specifically, the central authority 710 creates connection information with the best cloud nodes 102 for joint connections, from the user 702 to the enterprise file share and application 708, and the unique tokens (step 756). With the connection information, the cloud node 102A connects to the user 704, presenting a token, and the cloud node 102C connects to the lightweight connector 712, presenting a token (step 758). Now, a connection is stitched between the user 702 to the enterprise file share and application 708, through the application 704, the cloud nodes 102A, 102B, 102C, and the lightweight connector 712.

Comparison—VPN with Virtual Private Access

Figure 10:
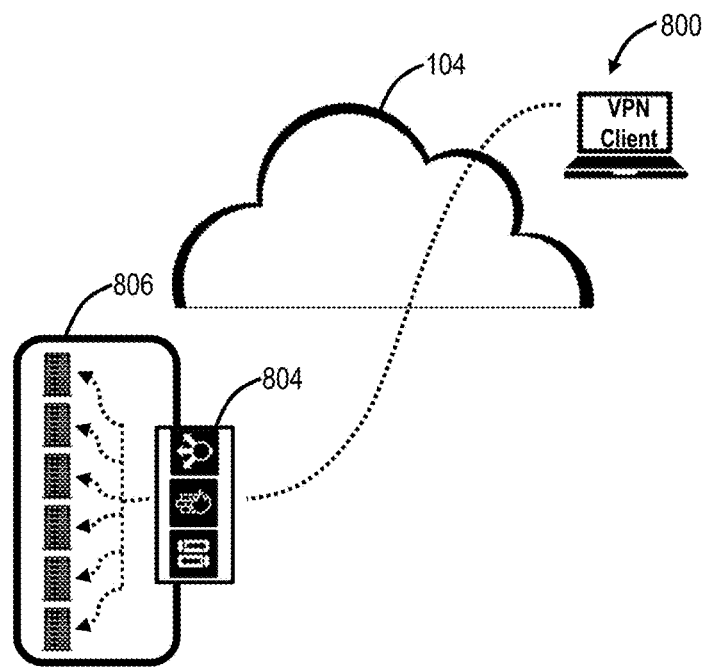
FIGS. 10-11 are network diagrams of a VPN configuration (FIG. 10) compared to virtual private access (FIG. 11) illustrating the differences therein.
Figure 11:
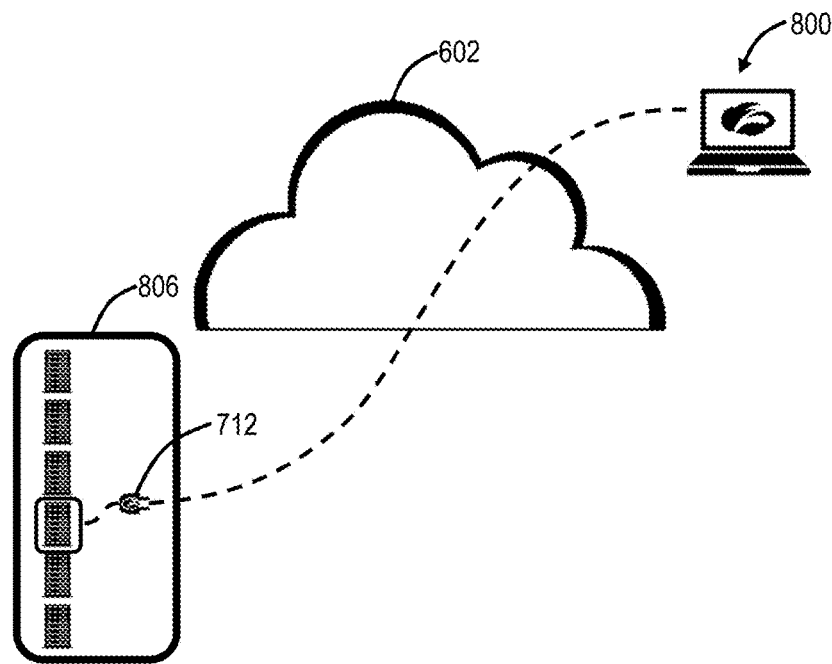

Referring to FIGS. 10-11, in an exemplary embodiment, network diagrams include a VPN configuration (FIG. 10) compared to virtual private access (FIG. 11) illustrating the differences therein. In FIG. 10, a user device 800 connects to a VPN termination device 804 associated with an enterprise network 806 via the Internet 104, such that the user device 800 is on the enterprise network 806, where associated applications reside. Of course, any malware on the user device 800 or anyone that steals the user device 800 is also on the enterprise network 806. The VPN termination device 804 creates a Distributed Denial-of-Service (DDoS) attack surface, adds infrastructure cost and creates network complexity as applications grow. Conversely in FIG. 11, the user device 800 uses the virtual private access via the security cloud 602 to connect to the lightweight connector 712 associated with a specific application. The virtual private access provides granular access by the user device 800 and the application, and the user device 800 is not on the enterprise network 806. Thus, the application is never directly exposed to the user device 800, the security cloud handles provisioning, and the traffic remains completely private.

Comparison—Private Applications in the Public Cloud

Figure 12:
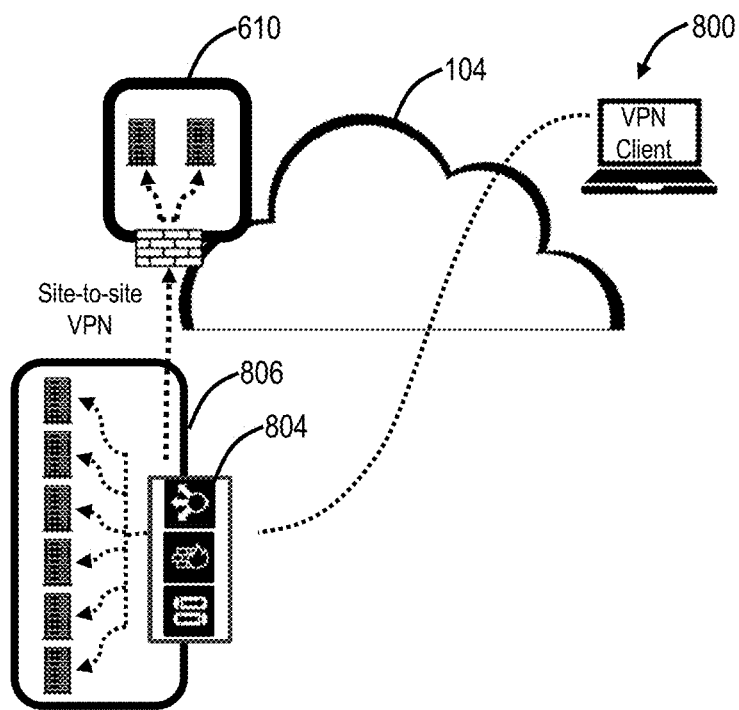
FIGS. 12-13 are network diagrams of conventional private application access in the public cloud (FIG. 12) compared to private application in the public cloud with virtual private access (FIG. 13)
Figure 13:
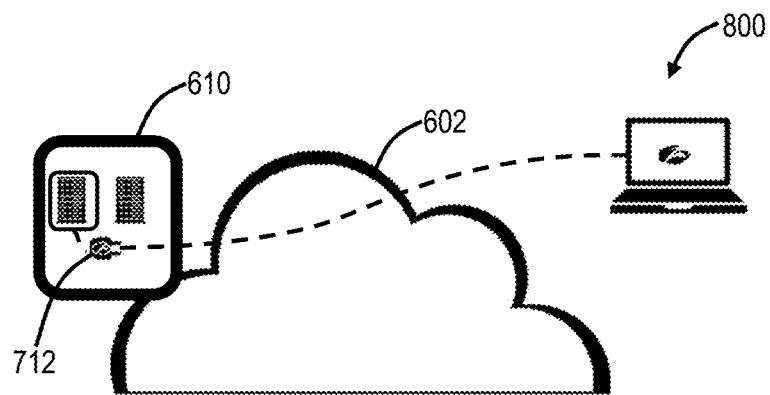

Referring to FIGS. 12-13, in an exemplary embodiment, network diagrams include conventional private application access in the public cloud (FIG. 12) compared to private application in the public cloud with virtual private access (FIG. 13). In FIG. 12, the user device 800 still has to connect to the enterprise network 806 via the VPN termination device 804 as in FIG. 10 and the cloud applications, such as in the data center 610, are access via the enterprise network 806 via a site-to-site VPN between the enterprise network 806 and the data center 610. Disadvantageously, the user experience is eroded for the user device 800 and agility is hampered for the enterprise by networking concerns and capability. In FIG. 13, the virtual private access abstracts the application, in the data center 610, from the IP address, so location is irrelevant. The enterprise can move private applications to the cloud securely, as needed.

Comparison—Contractor/Private Application Access

Figure 14:
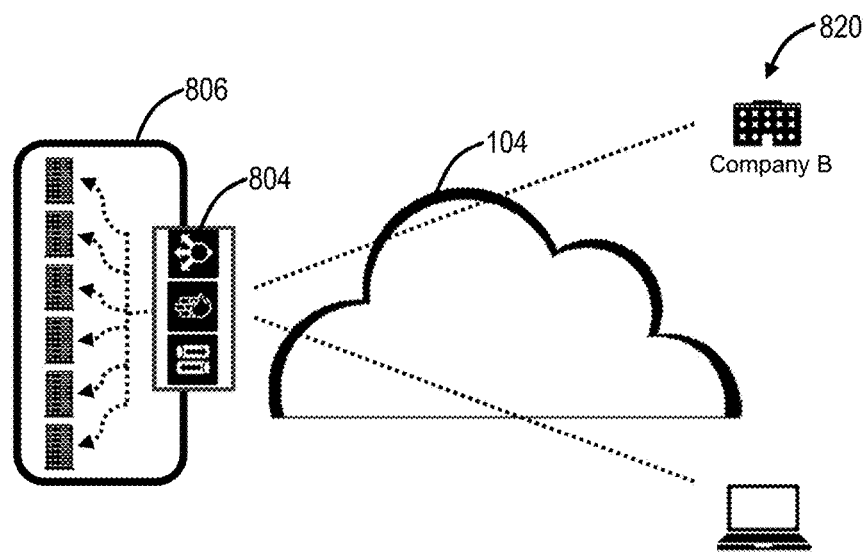
FIGS. 14-15 are network diagrams of conventional contractor/partner access (FIG. 14) of applications in the enterprise network compared to contractor/partner access (FIG. 15) of the applications with virtual private access.
Figure 15:
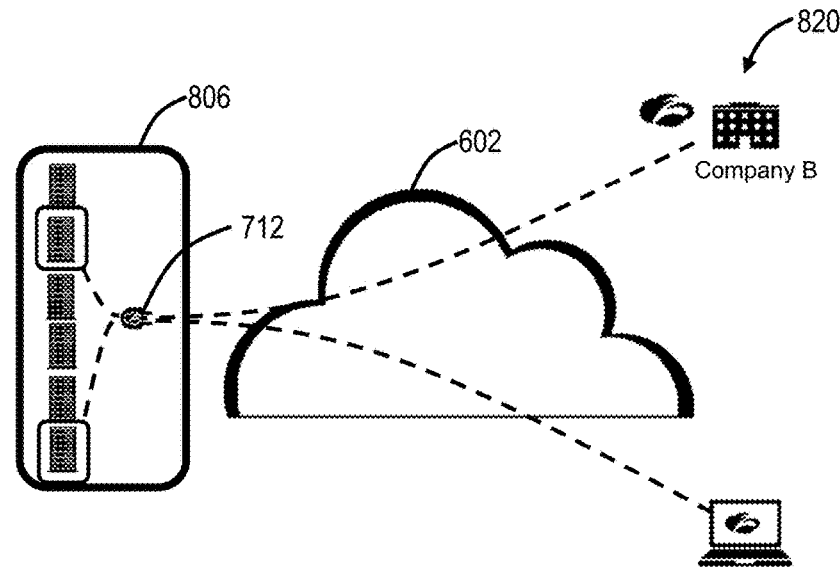

Referring to FIGS. 14-15, in an exemplary embodiment, network diagrams include conventional contractor/partner access (FIG. 14) of applications in the enterprise network 806 compared to contractor/partner access (FIG. 15) of the applications with virtual private access. Contractor/partner access includes provide third parties access to applications on the enterprise network 806, for a variety of purposes. In FIG. 14, similar to FIGS. 10 and 12, contractor/partner access includes VPN connections to the VPN termination device 804, providing contractor/partners 820 full access to the enterprise network 806, not just the specific application or asset that they require. Unfortunately, stolen credentials can allow hackers to get into networks or to map assets for later assault. In FIG. 15, the virtual private access, using the security cloud 602, allows access specific to applications or assets as needed by the contractor/partners 820, via the lightweight connector 712. Thus, the contractor/partners 820 do not have full network access, the access is specific to each user and the connections are provisioned dynamically avoiding a direct network connection that can be misused or exploited.

Comparison—Example Application—M&A Data Access

Figure 16:
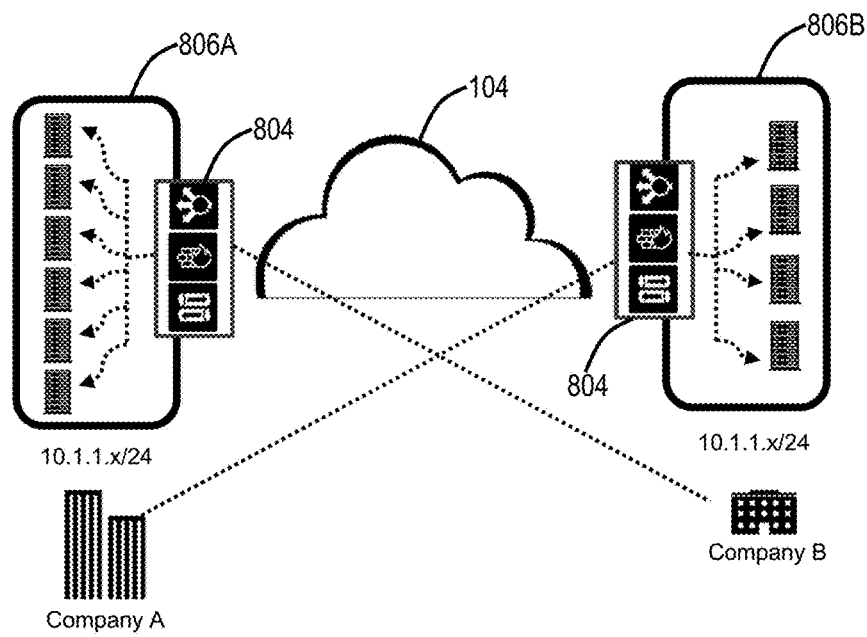
FIGS. 16-17 are network diagrams of a conventional network setup to share data between two companies (FIG. 16) such as for Merger and Acquisition (M&A) purposes or the like compared to a network setup using virtual private access (FIG. 17)
Figure 17:
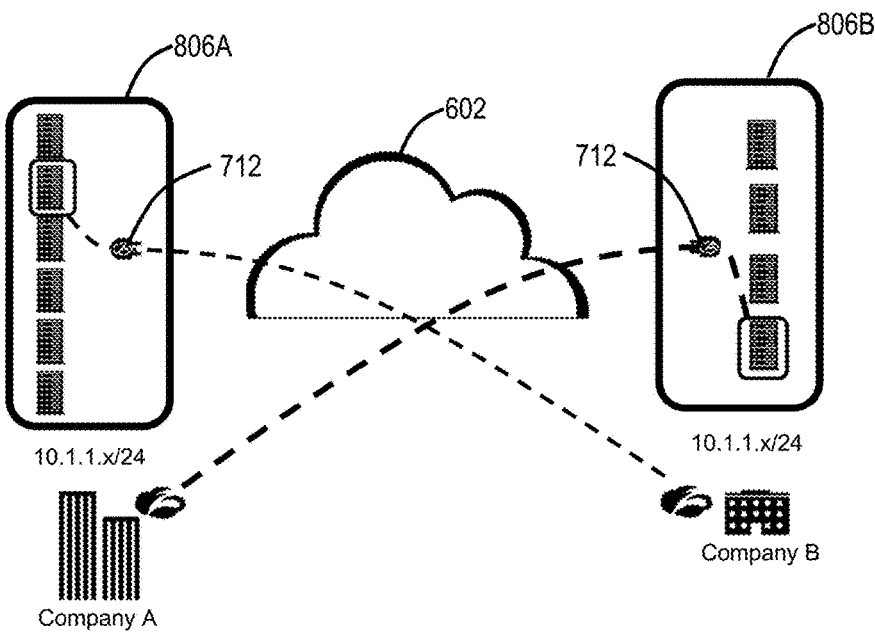

Referring to FIGS. 16-17, in an exemplary embodiment, network diagrams include a conventional network setup to share data between two companies (FIG. 16) such as for Merger and Acquisition (M&A) purposes or the like compared to a network setup using virtual private access (FIG. 17). Conventionally, the two companies provide VPN connections between their associated enterprise networks 806A, 806B to one another. Each company gets "all or nothing"— no per-application granularity. Disadvantageously, creating Access Control Lists (ACLs)/firewall rules and NATting through each companies' respective firewalls is very complex, particularly with overlapping internal IP addressing. In FIG. 17, the virtual private access allows connections provisioned by the user and device to the application by name, not by IP address, authorized users can access only specific applications, not an entire network, and firewall complexities disappear.

Administrative View of Virtual Private Access

Figure 18:
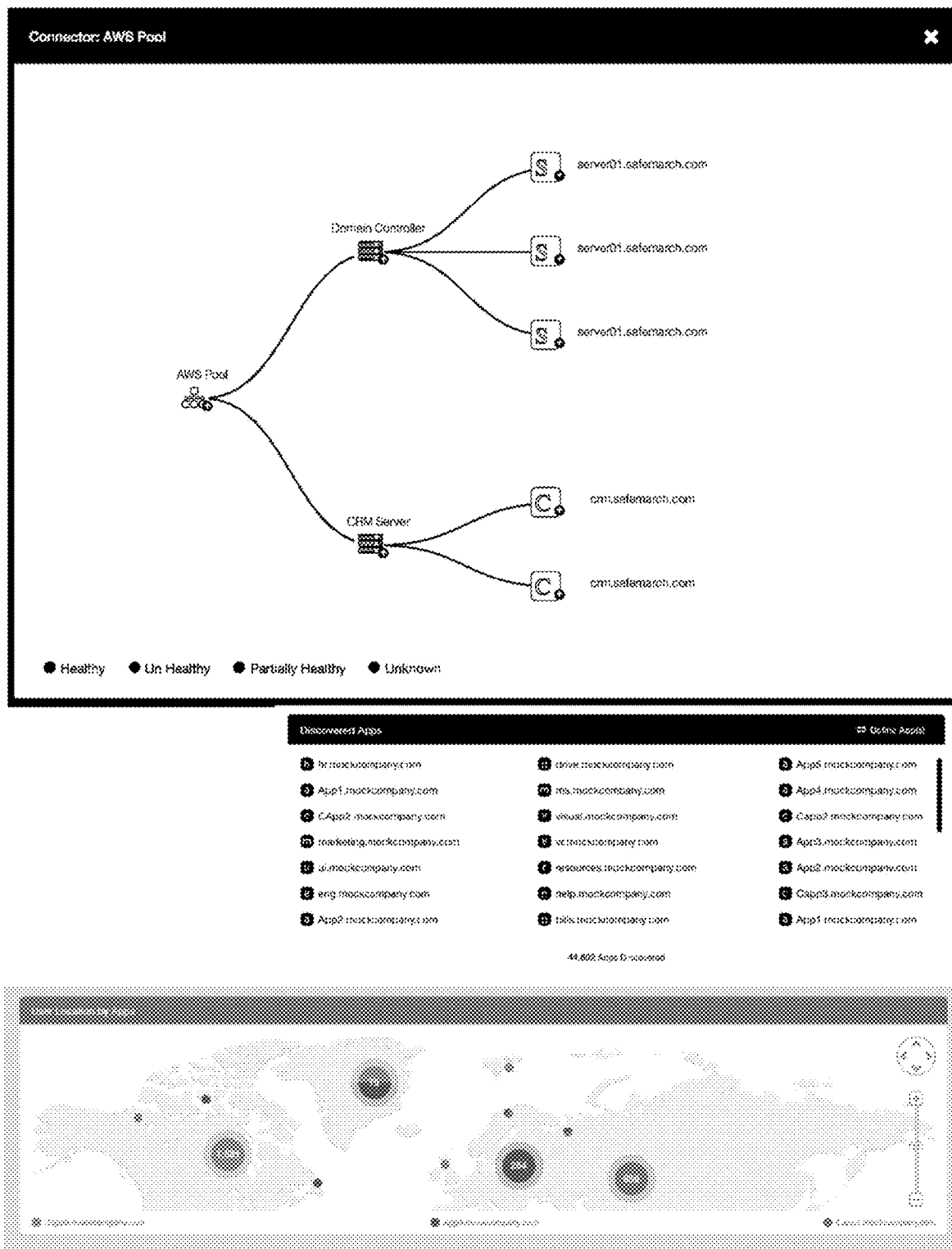
FIGS. 18-19 are screen shots of Graphical User Interfaces (GUIs) for administrator access to the virtual private access where FIG. 18 us a GUI of network auto discovery and FIG. 19 is a GUI for reporting.
Figure 19:
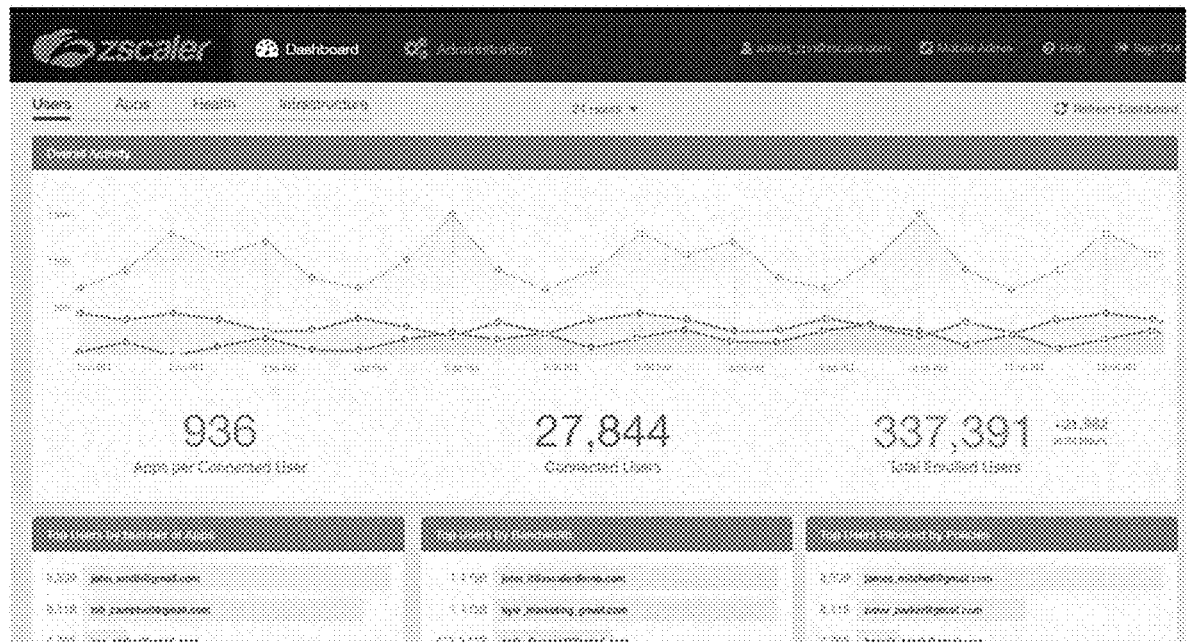

Referring to FIGS. 18-19, in an exemplary embodiment, screen shots illustrate Graphical User Interfaces (GUIs) for administrator access to the virtual private access. FIG. 18 illustrates a GUI of network auto-discovery and FIG. 19 illustrates a GUI for reporting. For network and application discovery, the virtual private access can use wildcard application discovery where a Domain/name-based query to the lightweight connector 712 will show company applications behind them. This allows discovery of internal applications as users request them using "*.company.com" to find applications. Then, granular policy can be built around the applications to dramatically simply startup. Further, the virtual private access can show the location of users that are accessing private/internal applications, including identifying anomalous access patterns to assist in stopping possible data leakage or compliance violation.

Virtual Private Access

In an exemplary embodiment, a virtual private access method implemented by a cloud system, includes receiving a request to access resources from a user device, wherein the resources are located in one of a public cloud and an enterprise network and the user device is remote therefrom on the Internet; forwarding the request to a central authority for a policy look up and for a determination of connection information to make an associated secure connection through the cloud system to the resources; receiving the connection information from the central authority responsive to an authorized policy look up; and creating secure tunnels between the user device and the resources based on the connection information. Prior to the receiving, a user executes an application on the user device, provides authentication, and provides the request with the application operating on the user device. The application can be configured to connect the user device to the cloud-based system, via an optimized cloud node based on a location of the user device. The resources can be communicatively coupled to a lightweight connector operating on a computer and communicatively coupled between the resources and the cloud system. The virtual private access method can further include detecting the resources based on a query to the lightweight connector. The lightweight connector can be prevented from accepting inbound connections, thereby preventing access of the resources external from the public cloud or the enterprise network. The creating secure tunnels can include creating connections between one or more cloud nodes in the cloud system, wherein the one or more cloud nodes do not participate in a key exchange, and the one or more cloud nodes do not have data access to traffic on the secure tunnels. The creating secure tunnels can include creating connections between one or more cloud nodes in the cloud system, wherein the one or more cloud nodes create the secure tunnels based on a combination of a client-side certificate and a server-side certificate. The secure tunnels can be created through software on the user device, the cloud system, and a lightweight connector operating on a computer associated with the resources, thereby eliminating dedicated hardware for virtual private network connections.

In another exemplary embodiment, a cloud system adapted to implement virtual private access includes one or more cloud nodes communicatively coupled to one another; wherein each of the one or more cloud nodes includes one or more processors and memory storing instructions that, when executed, cause the one or more processors to receive a request to access resources from a user device, wherein the resources are located in one of a public cloud and an enterprise network and the user device is remote therefrom on the Internet; forward the request to a central authority for a policy look up and for a determination of connection information to make an associated secure connection through the cloud system to the resources; receive the connection information from the central authority responsive to an authorized policy look up; and create secure tunnels between the user device and the resources based on the connection information. Prior to reception of the request, a user executes an application on the user device, provides authentication, and provides the request with the application operating on the user device. The application can be configured to connect the user device to the cloud based system, via an optimized cloud node based on a location of the user device. The resources can be communicatively coupled to a lightweight connector operating on a computer and communicatively coupled between the resources and the cloud system. The memory storing instructions that, when executed, can further cause the one or more processors to detect the resources based on a query to the lightweight connector. The lightweight connector can be prevented from accepting inbound connections, thereby preventing access of the resources external from the public cloud or the enterprise network. The secure tunnels can be created through connections between one or more cloud nodes in the cloud system, wherein the one or more cloud nodes do not participate in a key exchange, and the one or more cloud nodes do not have data access to traffic on the secure tunnels. The secure tunnels can be created through connections between one or more cloud nodes in the cloud system, wherein the one or more cloud nodes create the secure tunnels based on a combination of a client-side certificate and a server-side certificate. The secure tunnels can be created through software on the user device, the cloud system, and a lightweight connector operating on a computer associated with the resources, thereby eliminating dedicated hardware for virtual private network connections.

Software stored in a non-transitory computer readable medium including instructions executable by a system, which in response to such execution causes the system to perform operations including receiving a request to access resources from a user device, wherein the resources are located in one of a public cloud and an enterprise network and the user device is remote therefrom on the Internet; forwarding the request to a central authority for a policy look up and for a determination of connection information to make an associated secure connection through the cloud system to the resources; receiving the connection information from the central authority responsive to an authorized policy look up; and creating secure tunnels between the user device and the resources based on the connection information. The resources can be communicatively coupled to a lightweight connector operating on a computer and communicatively coupled between the resources and the cloud system, and wherein the instructions executable by the system, which in response to such execution can further cause the system to perform operations including detecting the resources based on a query to the lightweight connector.

VPN in the Cloud

In an exemplary embodiment, a method includes connecting to a client at a Virtual Private Network (VPN) device in a cloud system; forwarding requests from the client for the Internet or public clouds accordingly; and for requests for an enterprise associated with the client, contacting a topology controller to fetch a topology of the enterprise, causing a tunnel to be established from the enterprise to the VPN device, and forwarding the requests for the enterprise through the tunnel to the cloud-based system for proactive monitoring; and providing a secure connection from the cloud-based system back to the enterprise, including internal domain and subnets associated with the enterprise. The method can further include authenticating, via an authentication server, the client prior to the connecting and associated the client with the enterprise. The method can further include, subsequent to the connecting, setting a Domain Name Server (DNS) associated with the cloud system to provide DNS lookups for the client. The method can further include utilizing the DNS to determine a destination of the requests; and for the requests for the enterprise, contacting the topology controller to pre-fetch the topology of the enterprise. The method can further include operating an on-premises redirection proxy within the enterprise, wherein the on-premises redirection proxy is configured to establish the tunnel from the enterprise to the VPN device. Secure tunnels to the enterprise are dialed out from the enterprise by the on-premises redirection proxy. The on-premises redirection proxy is a virtual machine operating behind a firewall associated with the enterprise. The on-premises redirection proxy is configured as a bridge between the client and applications inside the enterprise. The VPN device operates on a cloud node in the cloud system, and wherein the cloud system includes a distributed security cloud. The VPN device can include one of a software instance on a cloud node or a virtual machine on the cloud node. The topology controller includes a network topology of the enterprise including internal domain names and subnets.

In another exemplary embodiment, a cloud system includes one or more Virtual Private Network (VPN) servers, wherein one or more clients connect securely to the one or more VPN servers; a topology controller communicatively coupled to the one or more VPN servers; a Domain Name Server (DNS) communicatively coupled to the topology controller and the one or more VPN servers; and a redirection proxy located in a private network and communicatively coupled to the one or more VPN servers and the topology controller; wherein requests from the one or more clients to the private network cause on demand secure connections being established by the redirection proxy to associated VPN servers in a cloud-based system, wherein the on demand secure connections provide connectivity to the private network including internal domain and subnets associated with the private network, and wherein the cloud-based system performs proactive monitoring. Requests from the one or more clients outside of the private network are forwarded without traversing the private network. The redirection proxy maintains a persistent connection to the topology controller and establishes secure tunnels to the one or more VPN servers based on direction from the topology controller. The topology controller includes a network topology of the private network including internal domain names and subnets. The VPN servers operate on cloud nodes in a distributed security cloud.

In yet another exemplary embodiment, a VPN system includes a network interface, a data store, and a processor, each communicatively coupled together; and memory storing instructions that, when executed, cause the processor to: establish a secure tunnel with a client; forward requests from the client to the Internet accordingly; and for requests to an enterprise, contact a topology controller to fetch a topology of the enterprise, cause a tunnel to be established from the enterprise to the VPN system, and forwarding the requests for the enterprise through the tunnel and the secure tunnel, wherein the secure tunnel is achieved by using an on-demand dial-out and tunneling traffic authentication. The memory storing instructions that, when executed, further cause the processor to: cause the tunnel to be established from the enterprise to the VPN system through an on premises redirection proxy located within the enterprise.

Clientless Connection Setup

In an exemplary embodiment, the client 410 can include the application 704 for performing the various virtual private access processes described herein. An example of such a client app is described in commonly-assigned U.S. Pat. No. 9,935,955, issued Apr. 3, 2018, and entitled "SYSTEMS AND METHODS FOR CLOUD BASED UNIFIED SERVICE DISCOVERY AND SECURE AVAILABILITY," the contents of which are incorporated by reference.

In another exemplary embodiment, the client 410 can connect via virtual private access in a so-called clientless connection approach described herein. The clientless connection approach can use a standard Web browser on the users 702 device. The clientless connection approach can be used with third-party users 702 (e.g., contractors), for one-time use by a user 702, or it situations where it is simply undesired to install the application 704. The object of the clientless connection approach is to perform the same techniques described herein for virtual private access, without the application 704 (alternatively, the application 704 can be viewed as the standard Web browser).

Figure 20:
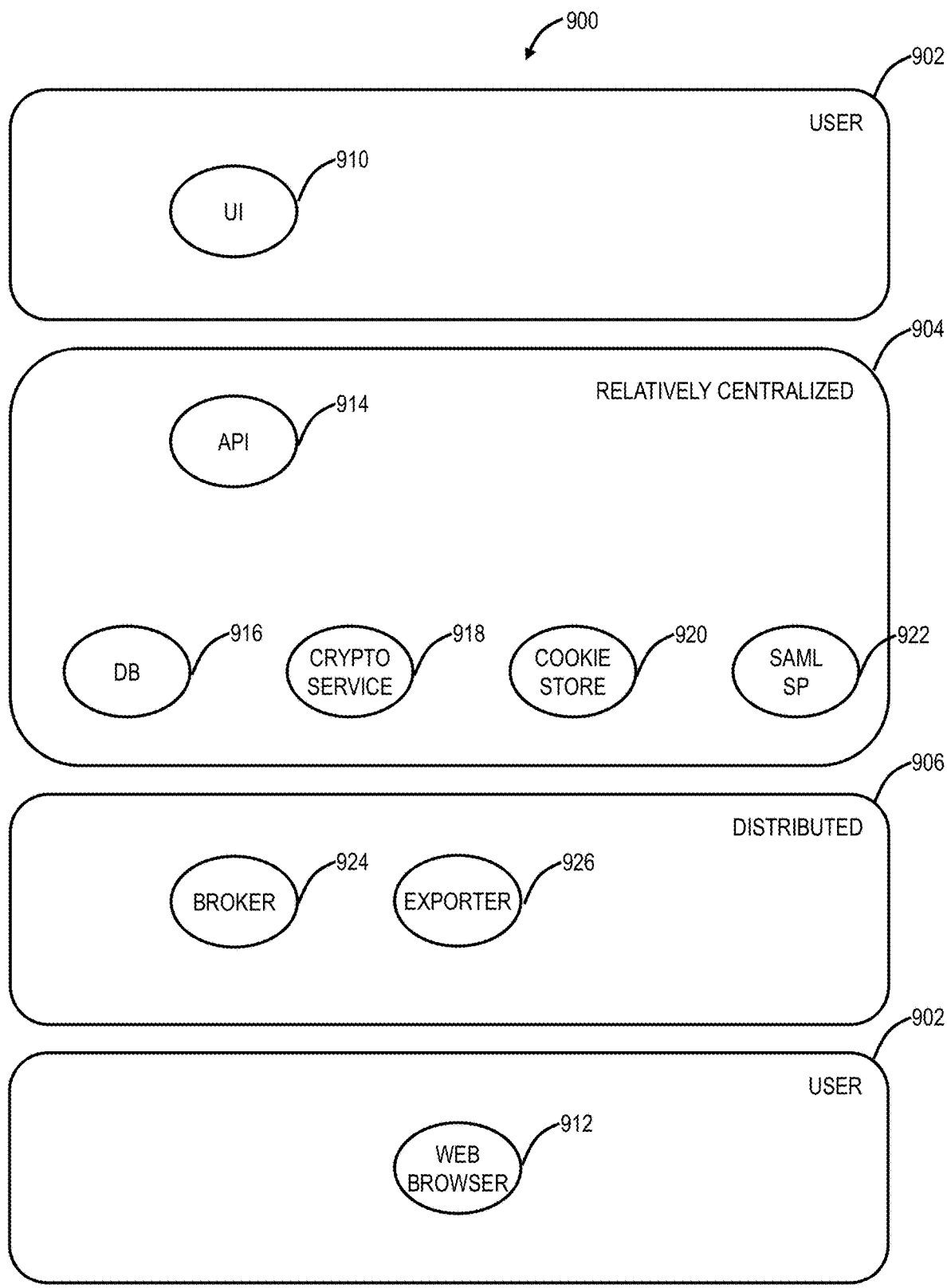
FIG. 20 is a block diagram of logical components of a clientless connection approach for the virtual private access.
Figure 21:
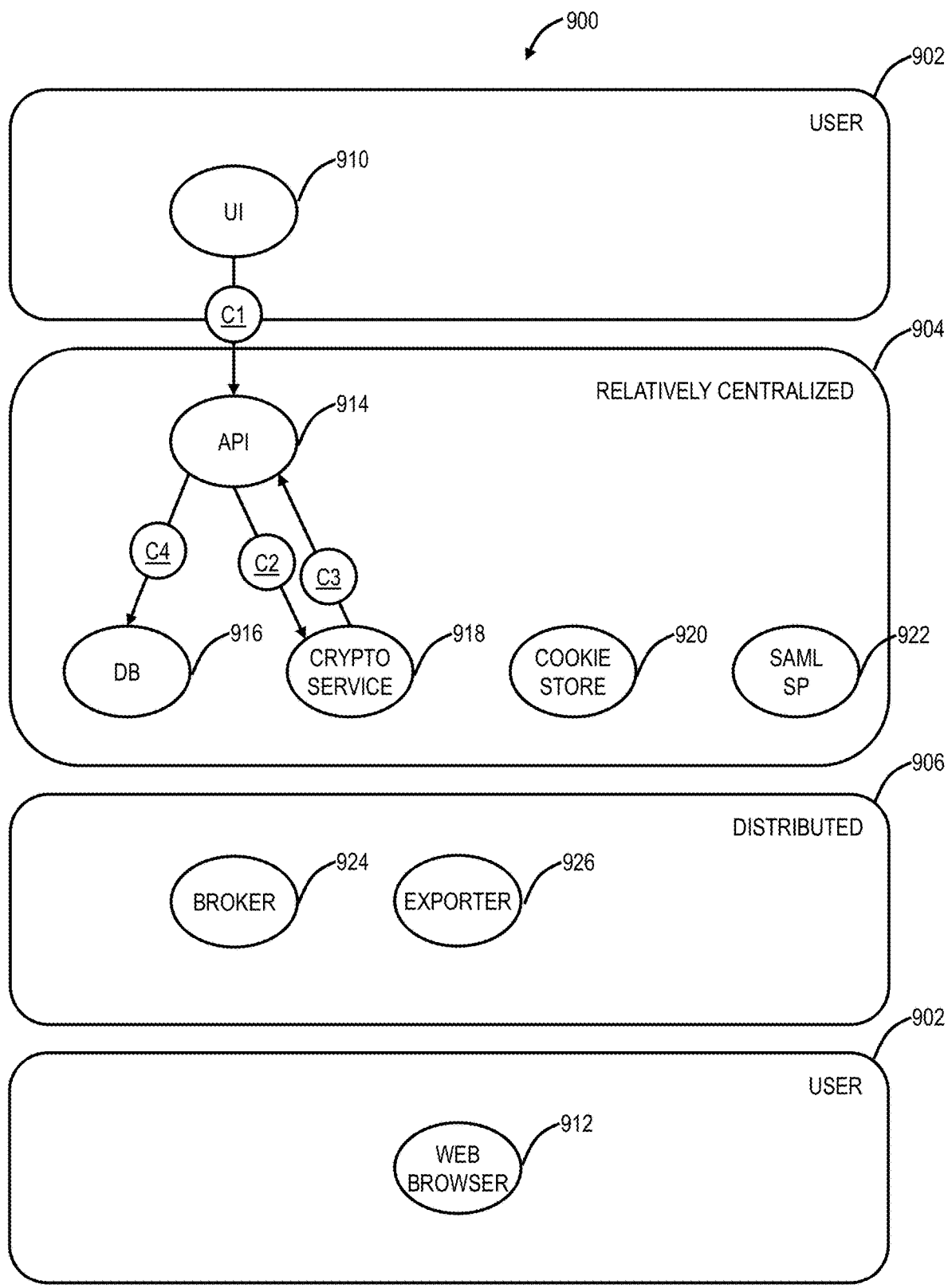
FIG. 21 is a block diagram of the logical components of the clientless connection approach of FIG. 20 illustrating the steps for configuration.
Figure 22:
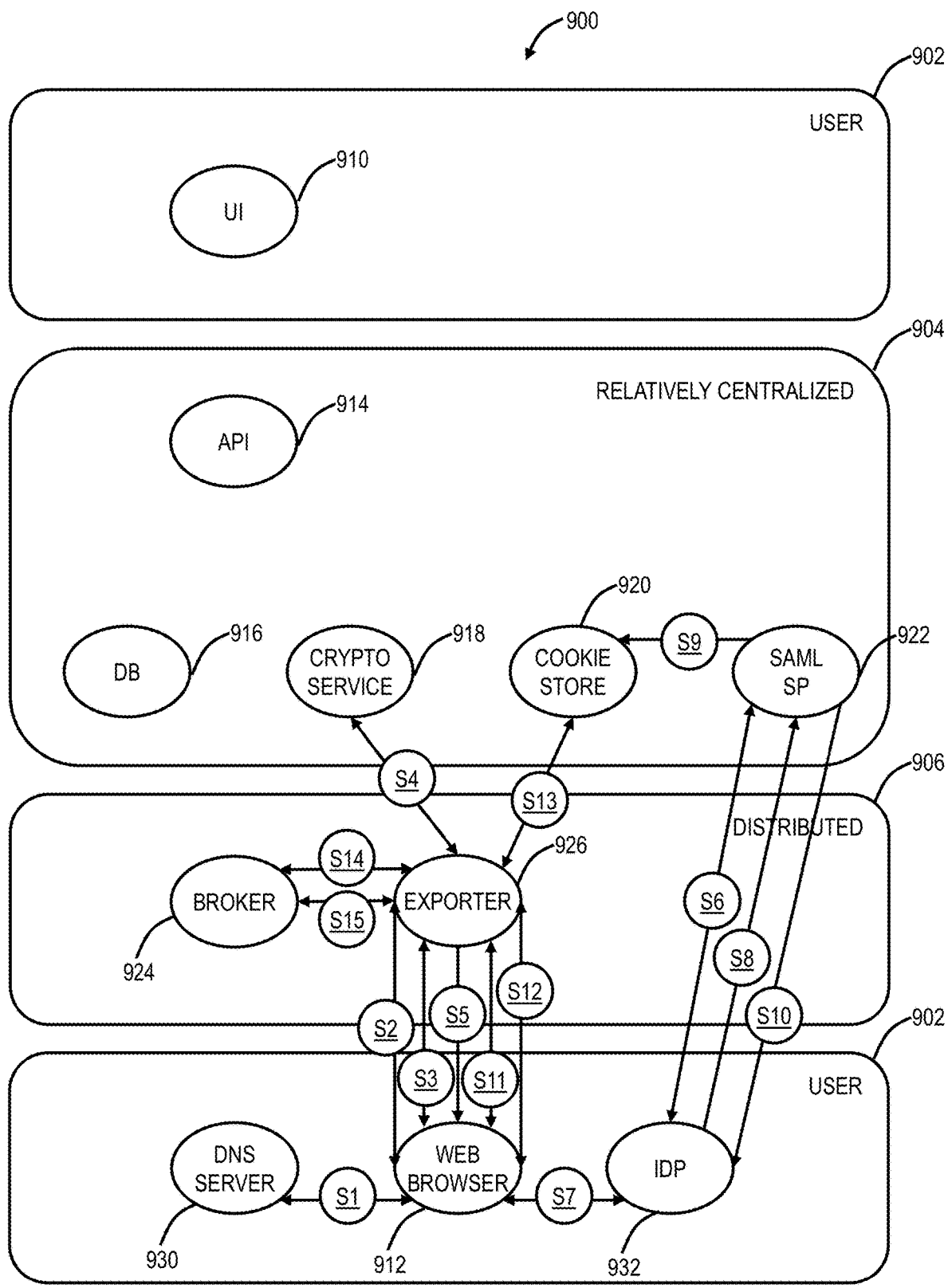
FIG. 22 is a block diagram of the logical components of the clientless connection approach of FIG. 20 illustrating the steps for a connection setup subsequent to the configuration of FIG. 21.

FIG. 20 is a block diagram of logical components of a clientless connection approach 900. FIG. 21 is a block diagram of the logical components of the clientless connection approach 900 illustrating the steps for configuration. FIG. 22 is a block diagram of the logical components of the clientless connection approach 900 illustrating the steps for a connection setup subsequent to the configuration.

The logical components are generalized at a user device 902, centralized components 904, and distributed components 906. The user device 902 can be the user 702 or any of the other users described herein. This can a mobile device 300 or any other type of device which can execute a Web browser. The centralized components 904 can be compute and storage resources in the cloud, on dedicated servers 200, or the like. For example, the centralized components 904 can be implemented in Amazon Web Services (AWS) infrastructure. Other embodiments are also contemplated. The distributed components 906 can be through the cloud system 100, such as through the cloud nodes 102.

The user device 902 can include a User Interface (UI) 910 and a Web browser 912. The UI 910 can be operated through the Web browser 912. The Web browser 912 can be a standard Web browser such as Google Chrome, Microsoft Edge/Explorer, Mozilla Firefox, Apple Safari, etc.

The centralized components 904 include an Application Programming Interface (API) 914, a database (DB) 916, a crypto service 918, a cookie store 920, and Security Assertion Markup Language (SAML) Service Provider (SP) component 922. The API 914 enables connectivity to the user device 902 for purposes of configuration. The database 916 stores public and private keys. The crypto service 918 creates/provides private keys. The SAML SP component 922 is used during the sign on process.

The distributed components 906 includes a broker 924 and an exporter 926 for creating clientless connections with the user device 902. The distributed components 906 can be implemented at each of the cloud nodes 102 in the cloud system 100.

In FIG. 21, a user device 902 performs a configuration such as through the UI 910 where a user of the user device 902 uploads a private+public key (step C1). Of note, the user can use existing private+public keys, create private+public keys through various providers, obtain a private+public key from the cloud system 100, etc. These keys are available at the user device 902 and provided to the cloud system 100 via the API 914 through the step C1.

The API 914 requests the crypto service 918 encrypt the private key (step C2). This request can include a namespace for the encryption context, e.g., the request can indicate 'for exporter' or something similar to designate the use in the clientless virtual private access, conceivably even per customer. The crypto service 918 encrypts the private key and returns the encrypted private key to the API 914 (step C3).

The API 914 stores the public+private key in the database 916 (step C4). Here, the private key is encrypted whereas the public key is not.

In FIG. 22, a user device 902 is already configured with a private+public key as described in FIG. 21 and performs a clientless connection via the Web browser 912 to an address, e.g., app.cust.com. The Web browser 912 can request app.cust.com from a DNS server 930 which CNAME's app.cust.com to an address of the exporter 926, e.g., cust.export.zscaler.com which can resolve to the nearest cloud node 102 acting as the exporter 926 (step S1).

The Web browser 912 can set a GET request to the exporter 926 using Transmission Control Protocol (TCP) port 80 (most common port for HTTP) and the exporter 926 recognizes the hostname as app.cust.com and redirects to TCP port 443 (which is used for Secure Sockets Layer (SSL)) (step S2).

The Web browser 912 opens Transport Layer Security (TLS) to the exporter 926 and sends the GET request (step S3). The exporter 926 utilizes Server Name Indication (SNI) to determine the certificate to present. SNI is an extension to the TLS protocol by which the user device 902 indicates which hostname it is attempting to connect to at the start of the handshaking process. The exporter can obtain the encrypted certificate from the database 916 and the certificate decryption key from the crypto service 918 and the crypto service 918 authenticates the exporter 926 based on the certificate credentials (step S4).

The exporter 926 parses HTTP and determines there is no valid cookie with the GET request (step S5). Note, if there were a valid cookie, the process could go to step S12. Note, other HTTP methods are also contemplated besides the GET request. The exporter 926 can redirect to the SAML SP component 922, encoding the original GET request in a query string.

The SAML SP component 922 performs normal SAML functions and redirects to an Identity Provider (IDP) 932 (step S6). The IDP 932 authenticates the user device 902 and redirects back to the SAML SP component 922 (step S7). The SAML SP component 922 receives an authentication response (assertion) (step S8).

The SAML SP component 922 generates a key (cookie) which is random plus some coding of the cookie store 920 in which it will be stored (step S9). The cookie and assertion are stored in the cookie store 920. The SAML SP component 922 redirects the user device 902 back to app.cust.com/zscalerauth/ . . . , encoding original GET request+cookie in the query string (step S10). Specifically, the redirect address includes app.cust.com plus a designation of authentication (/zscalerauth/) plus the original GET request and cookie in the encoded query string.

The exporter 926 receives the request for app.cust.com/zscalerauth/ . . . with encoded query string (step S11) and the exporter 926 redirects back to the original URL (app.cust.com) including a set-cookie with the authentication cookie encoded in steps S9, S10.

The exporter 926 receives the request with the authentication cookie (step S12). The exporter 926 fetches the assertion from the cookie store 920 (step S13). If the cookie (assertion) does not exist, is expired, etc., then the process returns to step S5.

The exporter 926 creates a virtual private access client context and authenticates to a broker 924 using end user assertion (step S14). The exporter 924 opens (or reuses an idle) tunnel for a request to app.cust.com. (step S15). As response arrives from the tunnel, it is sent back to the Web browser 912. Thus, the exporter 926 makes the virtual private access connection between the user device 902 through the Web browser 912 and app.cust.com.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A secure application access system comprising:
  a lightweight software connector communicatively coupled to a network interface, a processor communicatively coupled to the network interface, and memory storing instructions that, when executed, cause the processor to
    connect to a cloud-based system, via the network interface, wherein the lightweight software connector is configured to only dial out for connections over the Internet via the cloud-based system and is configured to reject inbound connections of any kind, connect to one or more of a file share and an application, via the network interface, wherein the lightweight software connector is associated with specific applications or file shares, responsive to a request from a user, perform a policy lookup for the user and the user device to determine if the user and the user device are authorized and, based on the policy, perform one of i) prevent the user from seeing the one or more of the file share and the application and ii) provide access to a user device to the one or more of the file share and the application via a stitched connection between the network interface and the user device through the cloud-based system, and responsive to additional instances of the one or more of the file share and the application, create additional lightweight software connectors.

2. The secure application access system of claim 1, wherein the lightweight software connector is in front of the file share and the application.

3. The secure application access system of claim 1, wherein the cloud-based system includes a plurality of cloud nodes with the user device and the network interface each connected to a different cloud node.

4. The secure application access system of claim 3, wherein the cloud-based system includes a central authority configured to perform the user and user device policy lookup and form the stitched connection.

5. The secure application access system of claim 1, wherein the one or more of the file share and the application are located in an enterprise network and the user device is located remote from the enterprise network.

6. The secure application access system of claim 5, wherein the user device is associated with a user having specific access rights such that the user device only has visibility of the one or more of the file share and the application, based on configuration of the specific access rights.

7. The secure application access system of claim 1, wherein the one or more of the file share and the application are located in a data center and the user device is located remote from the data center.

8. The secure application access system of claim 1, wherein the instructions that, when executed, cause the processor to receive a query for discovery, and respond to the query based on the one or more of the file share and the application connected thereto.

9. A non-transitory computer-readable medium comprising instructions that, when executed, cause a processor communicatively coupled to a network interface, to perform the steps of:

connecting a lightweight software connector to a cloud-based system, via the network interface, wherein the lightweight software connector is configured to only dial out for connections over the Internet via the cloud-based system and is configured to reject inbound connections of any kind, connecting the lightweight software connector to one or more of a file share and an application, via the network interface, wherein the lightweight software connector is associated with specific applications or file shares, responsive to a request from a user, performing a policy lookup for the user and the user device to determine if the user and the user device are authorized and, based on the policy, performing one of i) preventing the user from seeing the one or more of the file share and the application and ii) providing access to a user device to the one or more of the file share and the application via a stitched connection between the network interface and the user device through the cloud-based system, and responsive to additional instances of the one or more of the file share and the application, creating additional lightweight software connectors.

10. The non-transitory computer-readable medium of claim 9, wherein the lightweight software connector is in front of the file share and the application.

11. The non-transitory computer-readable medium of claim 9, wherein the cloud-based system includes a plurality of cloud nodes with the user device and the network interface each connected to a different cloud node.

12. The non-transitory computer-readable medium of claim 11, wherein the cloud-based system includes a central authority configured to perform the user and user device policy lookup and form the stitched connection.

13. The non-transitory computer-readable medium of claim 9, wherein the one or more of the file share and the application are located in an enterprise network and the user device is located remote from the enterprise network.

14. The non-transitory computer-readable medium of claim 13, wherein the user device is associated with a user having specific access rights such that the user device only has visibility of the one or more of the file share and the application, based on configuration of the specific access rights.

15. The non-transitory computer-readable medium of claim 9, wherein the one or more of the file share and the application are located in a data center and the user device is located remote from the data center.

16. The non-transitory computer-readable medium of claim 9, wherein the steps further include receiving a query for discovery, and responding to the query based on the one or more of the file share and the application connected thereto.

17. A method comprising:

connecting a lightweight software connector to a cloud-based system, via a network interface, wherein the lightweight software connector is configured to only dial out for connections over the Internet via the cloud-based system and is configured to reject inbound connections of any kind;

connecting the lightweight software connector to one or more of a file share and an application, via the network interface; wherein the lightweight software connector is associated with specific applications or file shares, responsive to a request from a user, performing a policy lookup for the user and the user device to determine if the user and the user device are authorized and, based on the policy, performing one of i) preventing the user from seeing the one or more of the file share and the application and ii) providing access to a user device to the one or more of the file share and the application via a stitched connection between the network interface and the user device through the cloud-based system, responsive to additional instances of the one or more of the file share and the application, creating additional lightweight software connectors.

18. The method of claim 17, further comprising
receiving a query for discovery; and
responding to the query based on the one or more of the file share and the application connected thereto.

* * * * *